United States Patent [19]
Winston et al.

[11] Patent Number: 6,019,485
[45] Date of Patent: *Feb. 1, 2000

[54] NONIMAGING OPTICAL ILLUMINATION SYSTEM

[75] Inventors: Roland Winston, Chicago, Ill.; Harald Ries, Villigen PSI, Switzerland

[73] Assignees: Minnesota Mining & Mfg. Co., St. Paul, Minn.; ARCH Development Corp., Chicago, Ill.

[*] Notice: This patent is subject to a terminal disclaimer.

[21] Appl. No.: 09/167,373

[22] Filed: Oct. 6, 1998

Related U.S. Application Data

[63] Continuation of application No. 08/745,239, Nov. 8, 1996, Pat. No. 5,816,693, which is a continuation of application No. 08/054,816, Apr. 28, 1993, Pat. No. 5,586,013.

[51] Int. Cl.$^7$ .................................................. F21V 7/09
[52] U.S. Cl. ........................................ 362/347; 362/350
[58] Field of Search .................................. 362/217, 347, 362/350, 296, 341, 346

[56] References Cited

U.S. PATENT DOCUMENTS

| | | | |
|---|---|---|---|
| 3,398,272 | 8/1968 | Elmer | 240/41.35 |
| 3,760,237 | 9/1973 | Jaffe | 317/234 R |
| 3,923,381 | 12/1975 | Winston | 350/293 |
| 3,949,318 | 4/1976 | Zeidler | 330/4.3 |
| 3,957,031 | 5/1976 | Winston | 126/270 |
| 4,002,499 | 1/1977 | Winston | 136/206 |
| 4,003,638 | 1/1977 | Winston | 350/293 |
| 4,045,246 | 8/1977 | Mlavsky et al. | 136/89 PC |
| 4,114,592 | 9/1978 | Winston | 126/270 |
| 4,130,107 | 12/1978 | Rabl et al. | 126/270 |
| 4,230,095 | 10/1980 | Winston | 126/439 |
| 4,237,332 | 12/1980 | Winston | 136/259 |
| 4,240,692 | 12/1980 | Winston | 350/96.1 |
| 4,327,969 | 5/1982 | Giutronich et al. | 350/296 |
| 4,359,265 | 11/1982 | Winston | 350/296 |
| 4,387,961 | 6/1983 | Winston | 350/296 |
| 4,483,007 | 11/1984 | Winston | 372/72 |
| 4,697,867 | 10/1987 | Blanc et al. | 350/96.1 |
| 4,790,620 | 12/1988 | Niwayama | 350/96.2 |
| 4,875,750 | 10/1989 | Spaeth et al. | 350/96.18 |
| 4,883,333 | 11/1989 | Yanez | 350/96.1 |
| 4,896,936 | 1/1990 | Stanley | 350/96.2 |
| 4,898,450 | 2/1990 | Jannson et al. | 350/96.21 |
| 4,912,614 | 3/1990 | Goldenberg | 362/347 |
| 4,922,107 | 5/1990 | Rabl et al. | 250/504 |
| 4,947,305 | 8/1990 | Gunter, Jr. | 362/297 |
| 4,956,759 | 9/1990 | Goldenberg et al. | 362/297 |
| 4,962,311 | 10/1990 | Poisel et al. | 250/216 |
| 4,964,025 | 10/1990 | Smith | 362/346 |
| 4,990,788 | 2/1991 | Rabl et al. | 250/504 |
| 5,136,491 | 8/1992 | Kano | 362/346 |
| 5,586,013 | 12/1996 | Winston et al. | 362/347 |

FOREIGN PATENT DOCUMENTS

| | | | |
|---|---|---|---|
| 60-100102 | 6/1985 | Japan | G02B 5/10 |
| 61-54430 | 3/1986 | Japan | G01N 21/27 |

OTHER PUBLICATIONS

Article "Reflectors for Efficient and Uniform Distribution of Radiation for Lighting and Infrared Based on Non–Imaging Optics", Cai et al.

*Primary Examiner*—Y. Quach
*Attorney, Agent, or Firm*—Michael D. Rechtin; Foley & Lardner

[57] ABSTRACT

A nonimaging illumination optical device for producing a selected far field illuminance over an angular range. The optical device includes a light source 102, a light reflecting surface 108, and a family of light edge rays defined along a reference line 104 with the reflecting surface 108 defined in terms of the reference line 104 as a parametric function $R(t)$ where t is a scalar parameter position and $R(t)=k(t)+Du(t)$ where $k(t)$ is a parameterization of the reference line 104, and D is a distance from a point on the reference line 104 to the reflection surface 108 along the desired edge ray through the point.

21 Claims, 25 Drawing Sheets

P(θ) = CONSTANT a = 0.055
b = 0.100
b = 12.36
c = 0.05136

$(\theta(\varphi) = ((\varphi - \varphi_0)))$ 6,019,485

1

NONIMAGING OPTICAL ILLUMINATION SYSTEM

Continuation of prior application Ser. No. 08/745,239, filed Nov. 8, 1996, now U.S. Pat. No. 5,816,693 which is a continuation of U.S. Ser. No. 08/054,816, filed Apr. 28, 1993 now U.S. Pat. No. 5,586,013.

Certain rights in this invention are retained by the U.S. Government pursuant to contract DE FG02-87ER 13726 of the U.S. Department of Energy.

The present invention is directed generally to a method and apparatus for providing user selected nonimaging optical outputs from various types of electromagnetic energy sources. More particularly, the invention is directed to a method and apparatus wherein the design profile of an optical apparatus for extended optical sources can be determined by controlling the shape of the reflector surface to a family of edge rays while simultaneously controlling the full contour of the reflected source. By permitting such a functional dependence, the nonimaging output can be well controlled using various different types of light sources.

Methods and apparatus concerning illumination by light sources are set forth in a number of U.S. patents including, for example, U.S. Pat. Nos. 3,957,031; 4,240,692; 4,359, 265; 4,387,961; 4,483,007; 4,114,592; 4,130,107; 4,237, 332; 4,230,095; 3,923,381; 4,002,499; 4,045,246; 4,912,614 and 4,003,638 all of which are incorporated by reference herein. In one of these patents the nonimaging illumination performance was enhanced by requiring the optical design to have the reflector constrained to begin on the emitting surface of the optical source. However, in practice such a design was impractical to implement due to the very high temperatures developed by optical sources, such as infrared lamps, and because of the thick protective layers or glass envelopes required on the optical source. In other designs it is required that the optical reflector be separated substantial distances from the optical source. In addition, when the optical source is small compared to other parameters of the problem, the prior art methods which use the approach designed for finite size sources provide a nonimaging output which is not well controlled; and this results in less than ideal illumination. Substantial difficulties arise when a particular illumination output is sought but cannot be achieved due to limitations in optical design. These designs are currently constrained by the teachings of the prior art that one cannot utilize certain light sources to produce particular selectable illumination output over angle.

It is therefore an object of the invention to provide an improved method and apparatus for producing a user selected nonimaging optical output from any one of a number of different light sources.

It is another object of the invention to provide a novel method and apparatus for providing user selected nonimaging optical output of light energy from optical designs by controlling edge rays of a reflected fight source.

It is a further object of the invention to provide an improved optical apparatus and method of design wherein the reflector surface is tailored to a family of edge rays.

It is a further object of the invention to provide an improved optical apparatus and method of design for radiation collection.

It is yet another object of the invention to provide a novel optical device and method for producing a user selected intensity output by simultaneously controlling the full contour of a reflected source and tairoing the reflector to a family of edge rays.

It is still an additional object of the invention to provide an improved method and apparatus for providing a nonim-

2 aging optical illumination system which generates a substantially uniform optical output over a wide range of output angles for finite size light sources.

Other objects, features and advantages of the present invention will be apparent from the following description of the preferred embodiments thereof, taken in conjunction with the accompanying drawings described below wherein like elements have like numerals throughout the several views.

DETAILED DESCRIPTION OF PREFERRED EMBODIMENTS

A. Small Optical Sources

Figure 1:
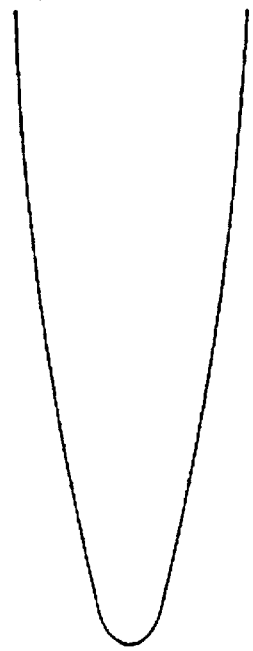
FIG. 1 shows a two-dimensional optical device for providing nonimaging output.

In the design of optical systems for providing nonimaging illuniination using optical sources which are small relative to other system parameters, one should consider the limiting case where the source has no extent. That is, for example, the size of the source is much less than the closest distance of approach to any reflective or refractive component. Thus the angle subtended by the source at any reflective or refractive component may be regarded as small. Our approximation of small source dimension d and large observer distance D amounts to $d \ll R_0 \ll D$. This is in a sense the opposite of the usual nonimaging problem where the finite size and specific shape of the source is critical in determining the desizn. In any practical situation, a source of finite, but small, extent can better be accomodated by the small-source nonimaging design described herein rather than by the existing prior art finite-source designs.

We can idealize a source by a line or point with negligible diameter and seek a one-reflection solution in analogy with the conventional "edge-ray methods" of nonimaging optics (see, for example, W. T. Welford and R. Wnston "High Collection Nonimazing Optics," Academic Press New York, N.Y. (1989)). Polar coordinates R, $\Phi$ are used with the source as origin and $\theta$ for the angle of the reflected ray as shown in FIG. 3. The geometry in FIG. 3 shows that the following relation between source angle and reflected angle applies:

$$d/d\Phi(\log R) = \tan \alpha, \quad (1)$$

where $\alpha$ is the angle of incidence with respect to the normal. Therefore, $$\alpha = (\Phi - \theta)/2 \quad (2)$$

Equation (1) is readily integrated to yield, $$\log(R) = \int \tan \alpha \, d\Phi + \text{const.} \quad (3)$$

so that, $$R = \text{const.} \exp \int (\tan \alpha \, d\Phi) \quad (4)$$

This equation (4) determines the reflector profile $R(\Phi)$ for any desired functional dependence $\theta(\Phi)$.

Suppose we wish to radiate power (P) with a particular angular distribution $P(\theta)$ from a line source which we assume to be axially symmetric. For example, $P(\theta) = \text{const.}$ from $\theta = 0$ to $\theta_1$ and $P(\theta) \sim 0$ outside this angular range. By conservation of energy $P(\theta)d\Phi = P(\Phi)d\Phi$ (neglecting mraterial reflection loss) we need only ensure that $$d\theta d\Phi = P(\Phi)/P(\theta) \quad (5)$$

to obtain the desire radiated beam profile. To illustrate the method, consider the above example of a constant $P(\theta)$ for a fine source. By rotational symmetry of the line source, $dP/d\Phi = a$ constant so that, according to Equation (4) we want $\theta$ to be a linear function of $\Phi$ such as, $\theta = a\Phi$. Then the solution of Equation (3) is $$R = R_0 / \cos^k(\Phi/k) \quad (6)$$

where, $$k = 2/(1-a), \quad (7)$$

and $R_0$ is the value of R at $\Phi = 0$.

We note that the case $a = 0 (k = 2)$ gives the parabola in polar form, $$R = R_0 / \cos^2(\Phi/2), \quad (8)$$

while the case $\theta = \text{constant} = \theta_1$ gives the off-axis parabola, $$R = R_0 \cos^2(\theta_1/2) / \cos^2[\Phi - \theta_0)/2] \quad (9)$$

Suppose we desire instead to illuminate a plane with a particular intensity distribution. Then we correlate position on the plane with angle q and proceed as above. Turning next to a spherically symmetric point source, we consider the case of a constant $P(\Omega)$ where $\Omega$ is the radiated sold angle. Now we have by energy conservation, $$P(\Omega)d\Omega = P(\Omega_0)d\Omega_0 \quad (10)$$

where $\Omega_0$ is the solid angle radiated by the source. By spherical symmetry of the point source, $P(\Omega_0) = \text{constant}$. Moreover, we have $d\Omega = (2\pi)d\cos\theta$ and $d\Omega_0 = (2\pi)d\cos\Phi$; therefore, we need to make $\cos\theta$ a linear function of $\cos\Phi$, $$\cos\theta = a \cos \Phi + b \quad (11)_1$$

With the boundary conditions that $\theta = 0$ at $\Phi = 0$, $\theta = \theta_1$ at $\Phi = \Phi_0$, we obtain, $$a = (1 - \cos\theta_1)/(1 - \cos\Phi_0) \quad (12)$$

$$b = (\cos\theta_1 - \cos\Phi_0)/(1 - \cos\Phi_0) \quad (13)$$

[For example, for $\theta_1 \ll 1$ and $\Phi_0 \sim \pi/2$ we have, $\theta \sim \sqrt{2}\theta_0 \sin(\frac{1}{2}\Phi)$.] This functional dependence is applied to Equation (4) which is then integrated, such as by conventional numerical methods.

A useful way to describe the reflector profile $R(\Phi)$ is in terms of the envelope (or caustic) of the reflected rays $r(\Phi)$. This is most simply given in terms of the direction of the reflected ray $t=(-\sin\theta, \cos\theta)$. Since $r(\Phi)$ lies along a reflected ray, it has the form, $$r=R+Lt. \quad (14)$$

where $R=R(\sin\Phi_1-\cos\Phi)$. Moreover, $$Rd\Phi=Ld\theta \quad (15)$$

which is a consequence of the law of reflection. Therefore, $$r=R+Rt/d\theta/d\phi \quad (16)$$

In the previously cited case where $\theta$ is the linear function $a\Phi$, the caustic curve is particularly simple, $$r=R+t/a \quad (17)$$

In terms of the caustic, we may view the reflector profile $R$ as the locus of a taut string; the string unwraps from the caustic $r$ while one end is fixed at the origin.

In any practical design the small but finite size of the source will smear by a small amount the "point-like" or "line-like" angular distributions derived above. To prevent radiation from returning to the source, one may wish to "begin" the solution in the vicinity of $\theta=0$ with an involute to a virtual source. Thus, the reflector design should be involute to the "ice cream cone" virtual source. It is well known in the art how to execute this result (see, for example, R. Wmston, "Appl. Optics," Vol. 17, p. 166 (1978)). Also, see U.S. Pat. No. 4,230,095 which is incorporated by reference herein. Similarly, the finite size of the source may be better accommodated by considering rays from the source to originate not from the center but from the periphery in the manner of the "edge rays" of nonimaging designs. This method can be implemented and a profile calculated using the computer program of the Appendix (and see FIG. 2) and an example of a line source and profile is illustrated in FIG. 1. Also, in case the beam pattern and/or source is not rotationally symmetric, one can use crossed two-dimensional reflectors in analogy with conventional crossed parabolic shaped reflecting surfaces. In any case, the present methods are most useful when the sources are small compared to the other parameters of the problem.

Various practical optical sources can include a long arc source which can be approximated by an axially symmetric line source. We then can utilize the reflector profile $R(\phi)$ determined hereinbefore as explained in expressions (5) to (9) and the accompanying text. This analysis applies equally to two and three dimensional reflecting surface profiles of the optical device.

Another practical optical source is a short arc source which can be approximated by a spherically symmetric point source. The details of determining the optical profile are shown in Equations (10) through (13).

Figure 4A:
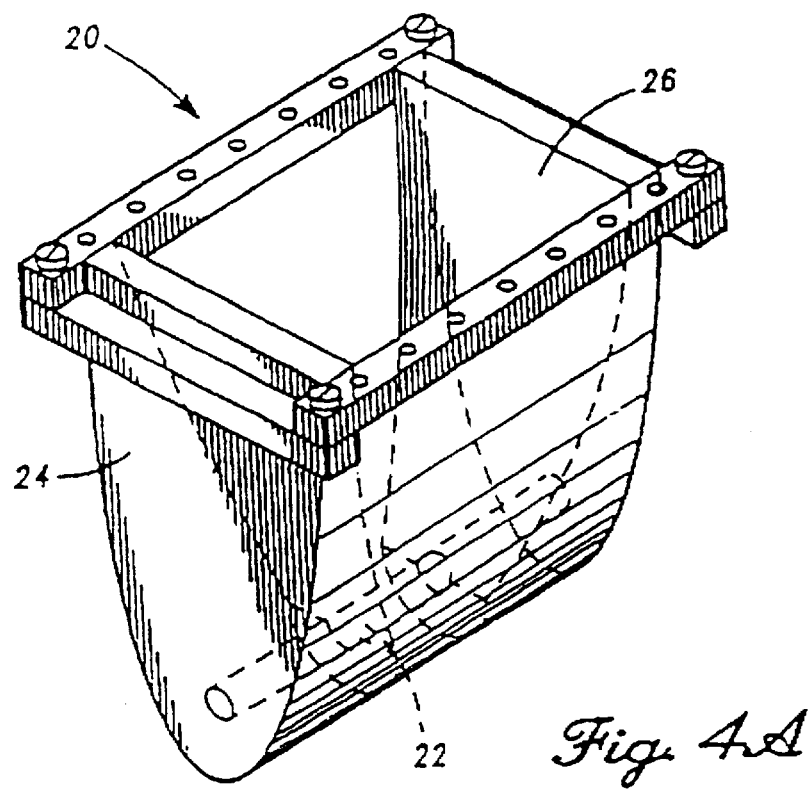
FIG. 4A shows a perspective view of a three-dimensional optical system for nonimaging illumination and FIG. 4B illustrates a portion of the optical system of FIG. 4A.
Figure 4B:
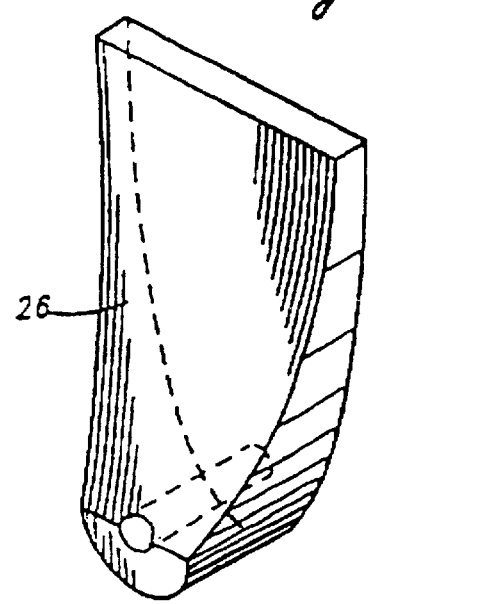
Figure 5A:
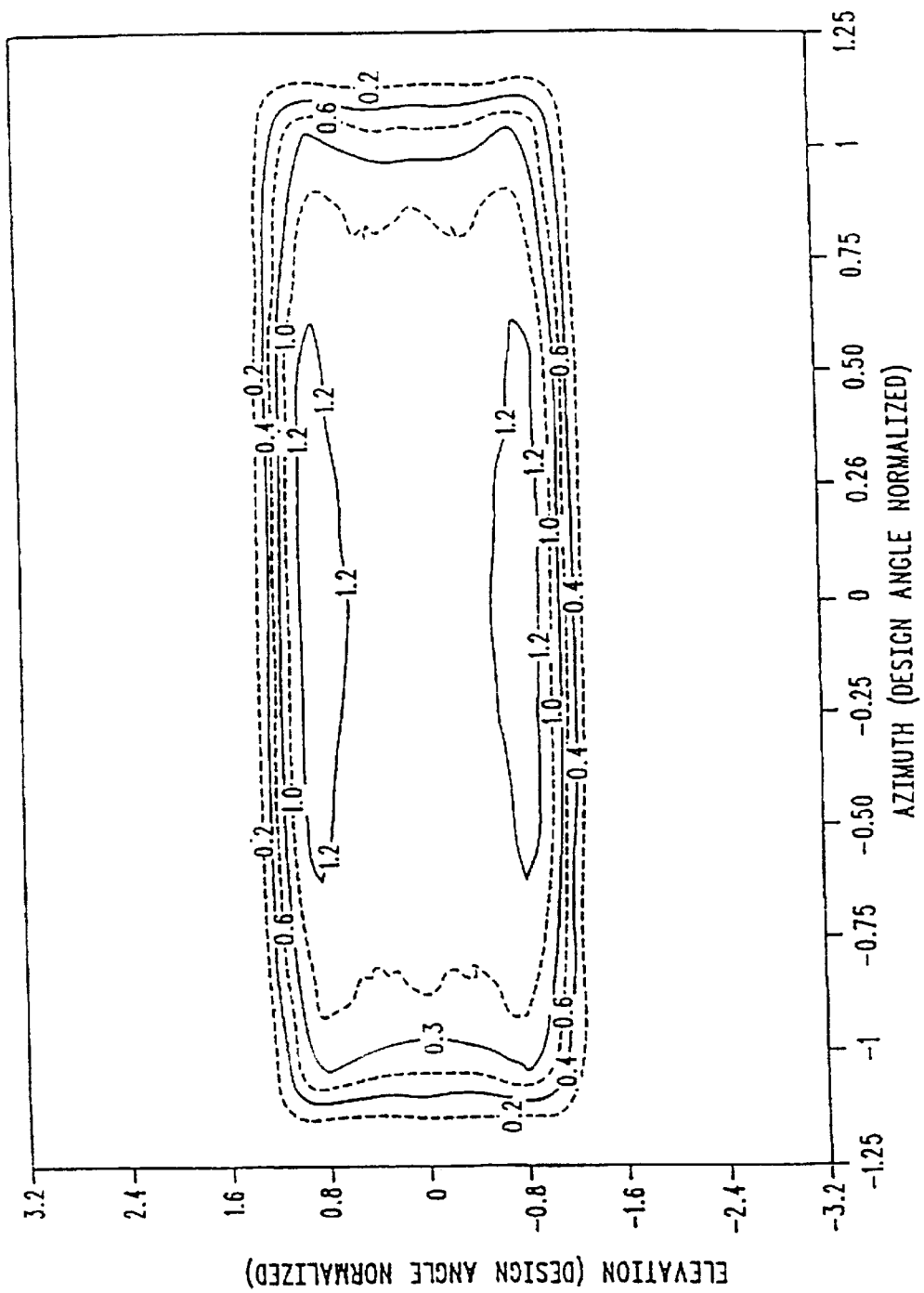
FIG. 5A shows intensity contours for an embodiment of the invention and FIG. 5B illustrates nonimaging intensity output contours from a prior art optical design.
Figure 5B:
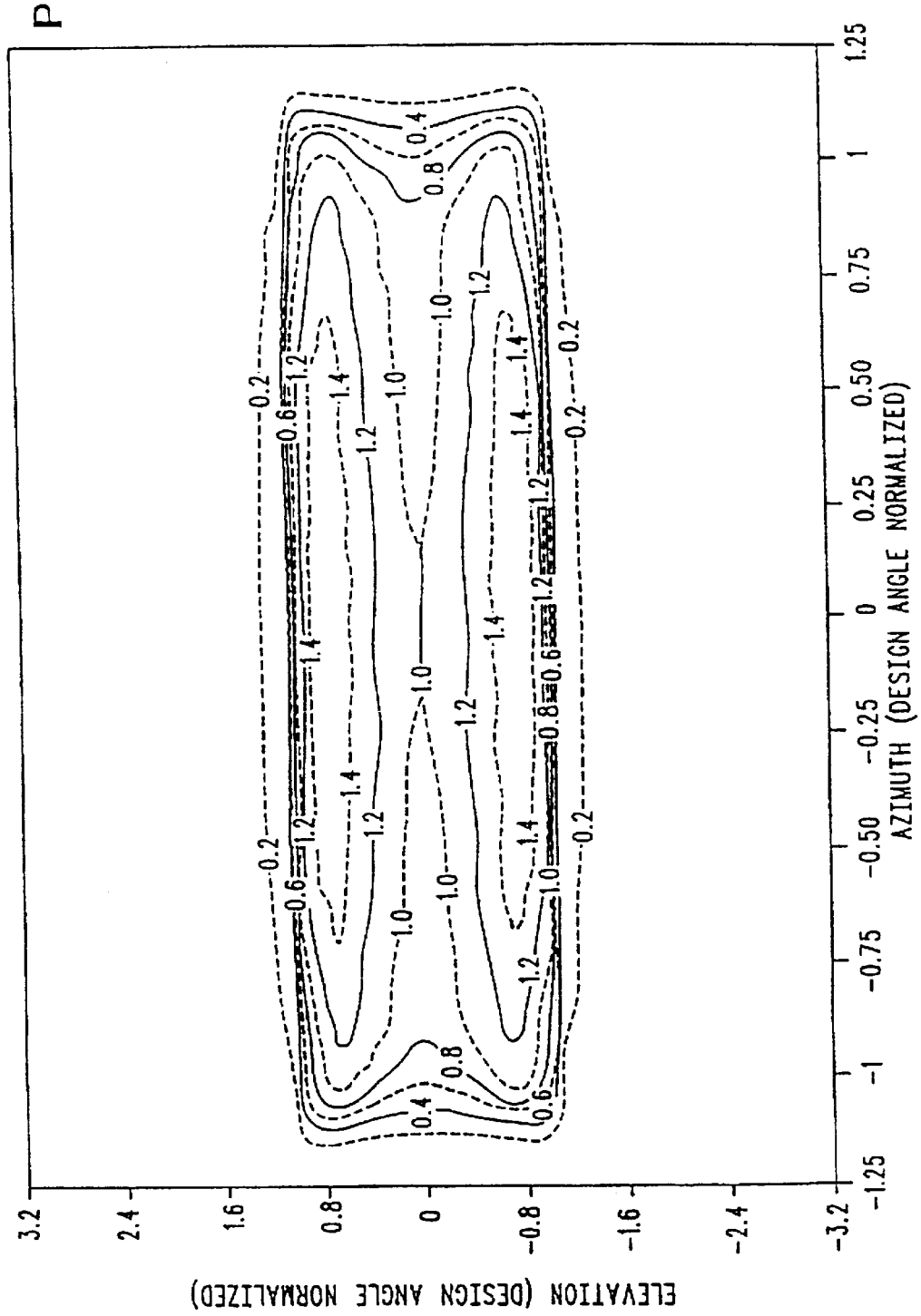

A preferred form of nonimaging optical system 20 is shown in FIG. 4A with a representative nonimaging output illustrated in FIG. 5A. Such an output can typically be obtained using conventional infrared optical sources 22 (see FIG. 4A), for example high intensity arc lamps or graphite glow bars. Reflecting side walls 24 and 26 collect the infrared radiation emitted from the optical source 22 and reflect the radiation into the optical far field from the reflecting side walls 24 and 26. An ideal infrared generator concentrates the radiation from the optical source 22 within a particular angular range (typically a cone of about [%]15 degrees) or in an asymmetric field of [%]20 degrees in the horizontal plane by a [%]6 degrees in the vertical plane. As shown from the contours of FIG. 5B, the prior art paraboloidal reflector systems (not shown) provide a nonuniform intensity output, whereas the optical system 20 provides a substantially uniform intensity output as shown in FIG. 5A. Note the excellent improvement in intensity profile from the prior art compound parabolic concentrator (CPC) design. The improvements are summarized in tabular form in Table I below:

TABLE I

| Comparison of CPC with Improved Design | | |
|---|---|---|
| | CPC | New Design |
| Ratio of Peak to On Axis Radiant Intensity | 1.58 | 1.09 |
| Ratio of Azimuth Edge to On Axis | 0.70 | 0.68 |
| Ratio of Elevation Edge to On Axis | 0.63 | 0.87 |
| Ratio of Corner to On Axis | 0.33 | 0.52 |
| Percent of Radiation Inside Useful Angles | 0.80 | 0.78 |
| Normalized Mouth Area | 1.00 | 1.02 |

In a prefered embodiment designing an actual optical profile involves specification of four parameters. For example, in the case of a concentrator design, these parameters are:
1. a=the radius of a circular absorber;
2. b=the size of the gap;
3. c=the constant of proportionality between $\theta$ and $\Phi-\Phi_0$ in the equation $\theta=_c(\Phi-\Phi_0)$;
4. h=the maximum height.

A computer program has been used to carry out the calculations, and these values are obtained from the user (see lines six and thirteen of the program which is attached as a computer sofware Appendix included as part of the specification).

Figure 3B:
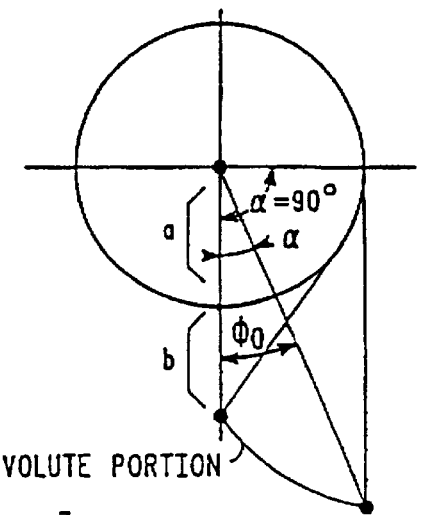
FIG. 3A illustrates a bottom portion of an optical system and FIG. 3B shows the involute portion of the reflecting surface with selected critical design dimensions and angular design parameters associated with the source.
Figure 3A:
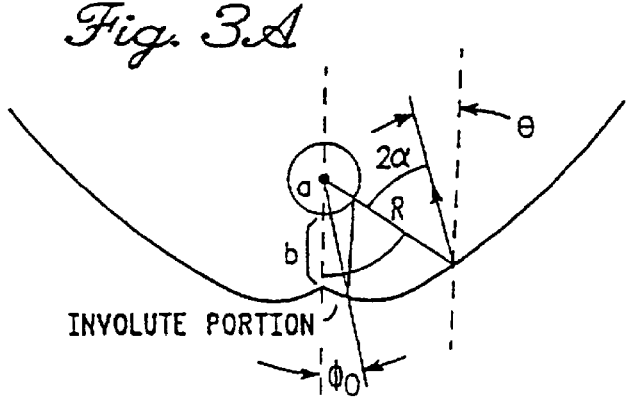

From $\Phi=0$ to $\phi=\Phi_0$ in FIG. 3B the reflector profile is an involute of a circle with its distance of closest approach equal to b. The parametric equations for this curve are parameterized by the angle $\alpha$ (see FIG. 3A). As can be seen in FIG. 3B, as $\Phi$ varies from 0 to $\Phi_0$, $\alpha$ varies from $\alpha_0$ to ninety degrees. The angle $\alpha_0$ depends on a and b, and is calculated in line fourteen of the computer software program. Between lines fifteen and one hundred one, fifty points of the involute are calculated in polar coordinates by stepping through these parametric equations. The $(r,\theta)$ points are read to arrays r(i), and theta(i), respectively.

For values of $\Phi$ greater than $\Phi_0$, the profile is the solution to the differential equation:

$$d(\ln r)/d\Phi=\tan\{\tfrac{1}{2}[\Phi-\theta+\text{arc }\sin(a/r)]\}$$

where $\theta$ is a function of $\phi$. This makes the profile $r(\phi)$ a functional of $\theta$. In the sample calculation performed, $\theta$ is taken to be a linear function of $\Phi$ as in step 4. Other functional forms are described in the specification. It is desired to obtain one hundred fifty (r,theta) points in this region. In addition, the profile must be truncated to have the maximum height, h. We do not know the (r,theta) point which corresponds to this height, and thus, we must solve the above equation by increasing phi beyond $\Phi_0$ until the maximum height condition is met. This is carried out using the conventional fourth order Runga-Kutta numerical integration method between lines one hundred two and one hundred and fifteen. The maximum height condition is checked between lines one hundred sixteen and one hundred twenty.

Once the (r,theta) point at the maximum height is known, we can set our step sizes to calculate exactly one hundred fifty (r,theta) points between $\phi_0$ and the point of maximum height. This is done between lines two hundred one and three hundred using the same numerical integration procedure. Again, the points are read into arrays r(i), theta(i).

In the end, we are left with two arrays: r(i) and theta(i), each with two hundred components specifying two hundred (r,theta) points of the reflector surface. These arrays can then be used for design specifications, and ray trace applications.

In the case of a uniform beam design profile, (P(θ)= constant), a typical set of parameters is (also see FIG. 1):

a=0.055 in.

b=0.100 in.

h=12.36 in.

c=0.05136 for θ(Φ)=c(Φ−Φ$_0$)

In the case of an exponential beam profile (P(θ)=ce$^{-a\theta}$) a typical set of parameters is:

$a \sim o$      $h = 5.25$ $b = 0.100$    $c = 4.694$ $\theta(\Phi) = 0.131 \ln - \left(1 - \dfrac{\Phi}{c}\right)$ Power can be radiated with a particular angular distribution $P^o(\theta)$ from a source which itself radiates with a power distribution $P^o(\phi)$. The angular characteristic of the source is the combined result of its shape, surface brightness, and surface angular enissiviry at each point. A distant observer viewing the source fitted with the reflector under an angle θ will see a reflected image of the source in addition to the source itself. This image will be magnified by some factor [M] if the reflector is curved. Ideally both the source and its reflected image have the same brightness, so the power each produces is proportional to the apparent size. The intensity perceived by the observer, $P^o(\theta)$ will be the sum of the two $$P^o(\theta) = P^o(\theta) + |M| P^o(\theta). \quad (18)$$

The absolute value of the magnification has to be taken because, if the reflected image and the source are on different sides of the reflector and we therefore perceive the image as reversed or upside down, then the magnification is negative. Actually, at small angles, the source and its reflection image can be aligned so that the observer perceives only the larger of the two. But if [M] is large, one can neglect the direct radiation from the source.

Thus, one is concerned with the magnification of the reflector. A distant observer will see a thin source placed in the axis of a trough reflector magnified in width by a factor $$Mm = \dfrac{d\phi}{d\theta} \quad (19)$$

This can be proved from energy conservation since the power emitted by the source is conserved upon reflection: $P^S d\phi = M\, P^S d\theta$.

Figure 2:
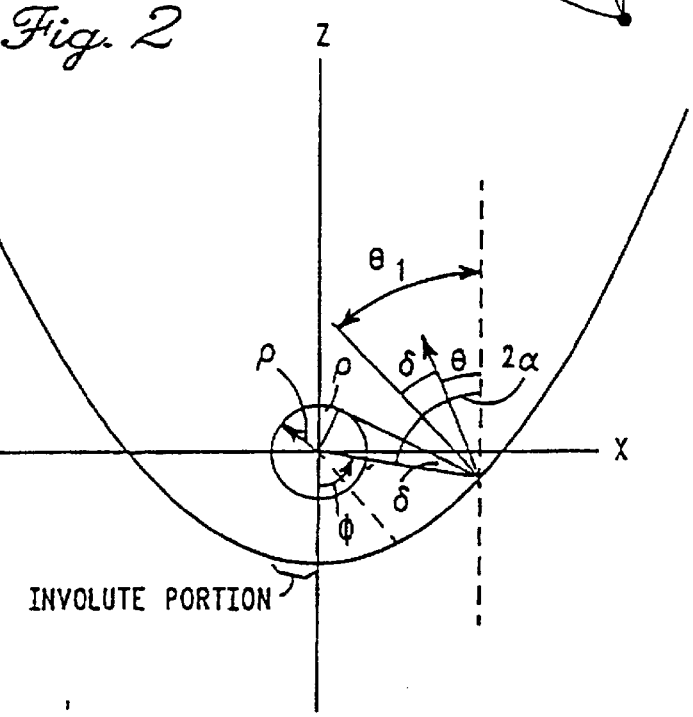
FIG. 2 illustrates a portion of the optical device of FIG. 1 associated with the optical source and immediate reflecting surface of the device.

For a rotationally symmetric reflector the magnification, Mm as given in Eq.(19) refers to the meridional direction. In the sagittal direction the magnification is $$Ms = \dfrac{d\mu 1}{d\mu 2} = \dfrac{\sin\phi}{\sin\theta} \quad (20)$$

where now $\mu_1$ and $\mu_2$ are small angles in the sagittal plane, perpendicular to the cross section shown in FIG. 2. Equation (20) can be easily verified by noting that the sagittal image of an object on the optical axis must also lie on the optical axis. The reason for this is that because of symmetry, all reflected rays must be coplanar with the optical axis.

The total magnification $M_t$ is the product of the sagittal and the meridional magnification $$Mt = MsMm = \dfrac{d\cos(\phi)}{d\cos\theta} \quad (21)$$

Actually Eq.(21) could also have been derived directly from energy conservation by noting that the differential solid angle is proportional to d cos(θ) and d cos(φ) respectively.

Thus, inserting the magnification given in Eq. (21) or Eq.(19), as the case may be, into Eq.(18) yields the relationship between φ and θ which produces a desired power distribution P(θ) for a given angular power distribution of the source $P^S$. This relationship then can be integrated as outlined in Eq. 17 to construct the shape of the reflector which solves that particular problem.

There are two qualitatively different solutions depending on whether we assume the magnification to be positive or negative. If Mm>0 this leads to CEC-type devices, whereas Mm<0 leads to CHC-type devices. The term CEC refers to Compound Elliptical Concentrator and CHC to the so called Compound Hyperbolic Concentrator.

Now the question arises of how long we can extend the reflector or over what angular range we can specify the power distribution. From Eq.(17) one can see that if φ−θ=π then R diverges. In the case of negative magnification this happens when the total power seen by the observer between θ=0 and θ=θ$^{max}$ approaches the total power radiated by the source between φ=0 and φ=π. A similar limit applies to the opposite side and specifies θ$^{min}$. The reflector asymptotically approaches an infinite cone or V-trough. There is no power radiated or reflected outside the range θ$^{min}$<θ<θ$^{max}$.

For positive magnification the reflected image is on the opposite side of the symmetry axis (plane) to the observer. In this case the limit of the reflector is reached as the reflector on the side of the observer starts to block the source and its reflection image. For symmetric devices this happens when φ+θ=π. In this case too one can show that the limit is actually imposed by the first law. However, the reflector remains finite in this limit. It always ends with a vertical tangent. For symmetric devices where θ$^{max}$=−θ$^{min}$ and φ$^{max}$=φ$^{min}$ the extreme directions for both the CEC-type and the CHC-type solution are related by $$\phi^{max} + \theta^{max} = \pi \quad (22)$$

In general CEC-type devices tend to be more compact. The mirror area needed to reflect a certain beam of light is proportional to 1/cos(α). The functional dependence of θ and φ for syntnetrical problems is similar except that they have opposite signs for CHC-type devices and equal signs for CEC-type solutions. Therefore α increases much more rapidly for the CHC-type solution which therefore requires a larger reflector, assuming the same initial value $R_0$. This is visualized in FIG. 8 and where the acceptance angle function as well as the incidence angle α are both plotted for the negative magnification solution.

To illustrate rate the above principles, consider a strip source as an example. For a narrow, one-sided larnbertain strip, the radiant power in proportional to the cosine of the angle. In order to produce a constant irradiance on a distant target the total radiation of source and reflection should therefore be proportional to $1/\cos^2(\theta)$. This yields $$\cos\theta + \left|\cos(\phi)\frac{d\phi}{d\theta}\right| = \frac{a}{\cos^2(\theta)} \quad (23)$$

The boundary condition is, in this case, $\theta=0$ at $\phi=\pm\pi/2$ because we assume that the strip only radiates on one side, downward. Equation 11 can only be integrated for a $\alpha=1$:

$$\sin(\phi)=1-|\tan(\theta)-\sin(\theta)|. \quad (24)$$

Figure 8:
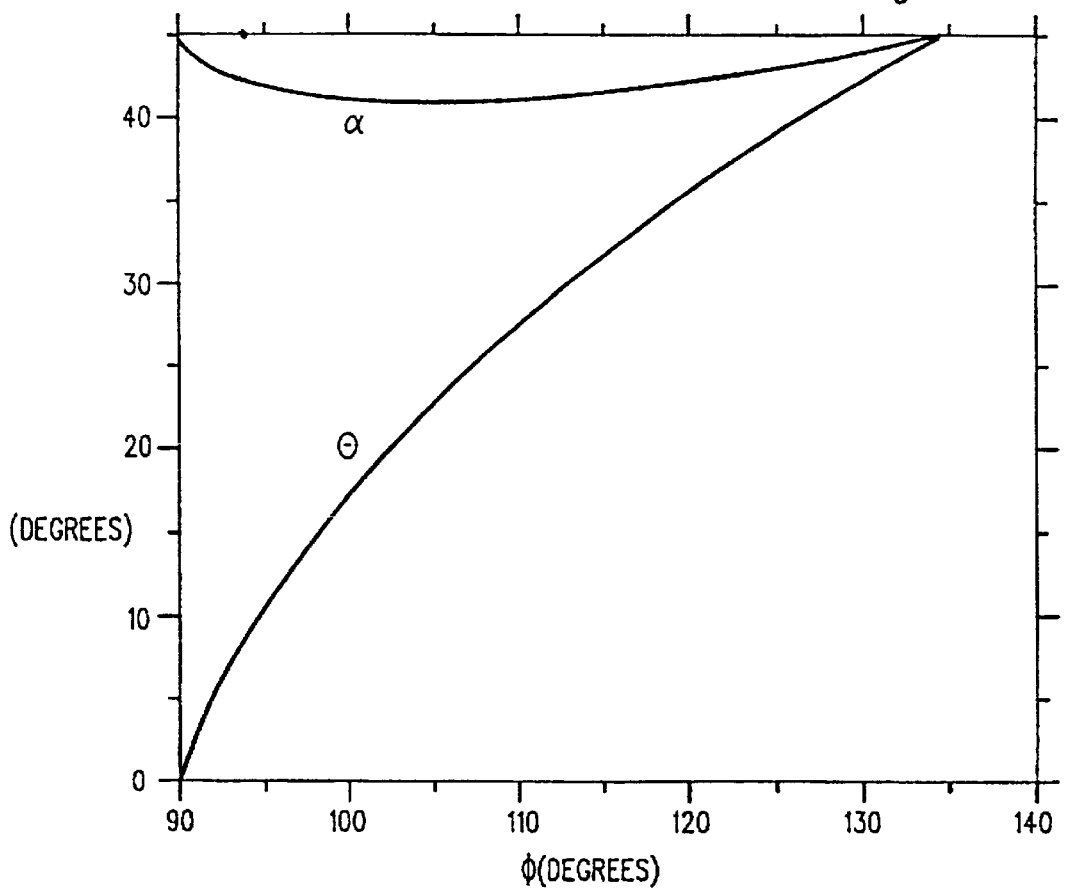
FIG. 8 shows an acceptance angle function which produces a constant irradiance on a distant plane from a narrow one-sided lambertian strip source (2D) with a=1.
Figure 9:
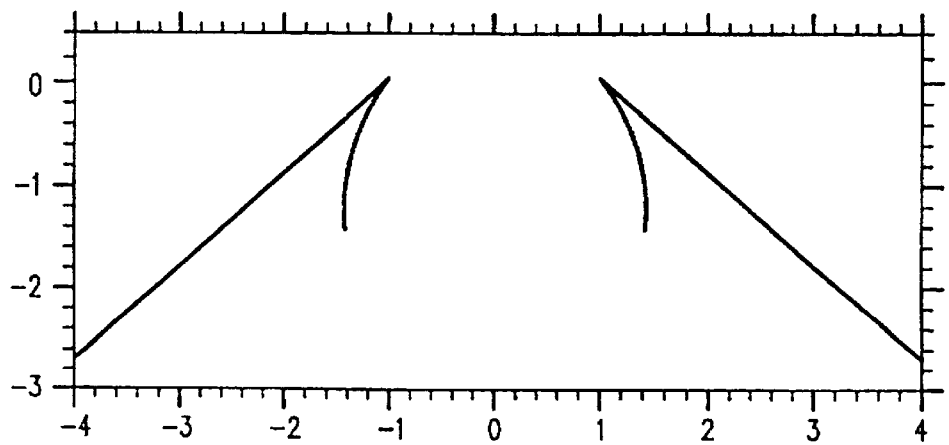
FIG. 9 illustrates a reflector profile which produces a constant irradiance on a distant plane from a one-sided lambertian strip source (2D) at the origin, $R(\phi=\pi/2)=1$, a=1. CEC (inner curve) and CHC-type solutions (outer truncated curve) are shown.

The acceptance angle function $\theta$ as well as the incidence angle for the CEC-type solution are shown in FIG. 8. Integrating yields the reflector shapes plotted in FIG. 9.

Figure 10:
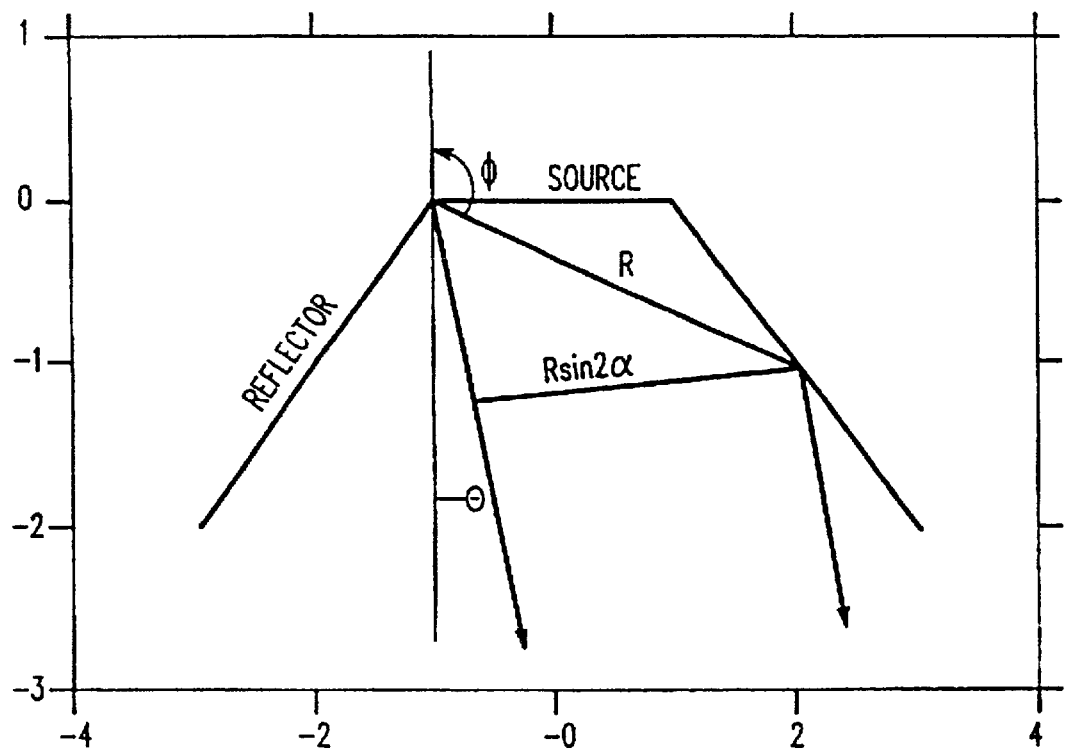
FIG. 10 shows a reflector designed to produce a reflected image adjacent to the source; the combined intensity radiated in the direction $-\theta$ is determined by the separation of the two edge rays: R sin 2α.

The analytical tools described herein can be used to solve real problems which involve reflectors close to the source. This is done by combining the above technique with the edge ray method which has proved so effective in nonimaging designs. That is, the above methods can be applied to edge rays. As a first example, a reflector is designed for a planar, lambertian strip source so as to achieve a predetermined far-field irradiance. The reflector is designed so that the reflected image is immediately adjacent to the source. This is only possible in a negative magnification arrangement. Then the combination of source and its mirror image is bounded by two edge rays as indicated in FIG. 10. The combined angular power density for a source of unit brightness radiated into a certain direction is given by the edge ray separation.

$$R \sin(2\alpha)=P^o(\theta).$$

By taking the logarithmic derivative of Eq.(25) and substituting the following:

$$\frac{d(\log(R))}{d\phi} = \tan\alpha \quad (26)$$

$$\frac{d\alpha}{d\theta} = \frac{\sin(2\alpha)d\log(P^o(\theta))}{2d\theta} - \sin^2(\alpha) \quad (27)$$

This describes the right hand side, where $\theta<0$. The other side is the mirror image.

For $2\alpha=\pi$, R diverges just as in the case of the CHC-type solutions for small sources. Thus, in general the full reflector extends to infinity. For practical reasons it will have to be truncated. Let's assume that the reflector is truncated at a point T from which the edge ray is reflected into the direction $\theta\tau$. For angles $\theta$ in between $\pm\theta\tau$ the truncation has no effect because the outer parts of the reflector do not contribute radiation in that range. Therefore within this range the truncated reflector also produces strictly the desired illumination. Outside this range the combination of source plus reflector behaves like a flat source bounded by the point T and the opposite edge of the source. Its angular power density is given by Eq.(13) with $R=R\tau$=constant. The total power $P\tau$ radiated beyond $\theta\tau$ is thus $$P_T = R(\theta_T)\int_{2\theta_{0T}}^{\pi}\sin_y d_y = R(\theta_T)(1+\cos(2\alpha_T)) \quad (28)$$

In order to produce an intensity $P^o(\theta\tau)$ at $\theta\tau$, $R(\theta\tau)$ must be $$R(\theta_T) = \frac{P^o(\theta_T)}{\sin(2\alpha_T)} \quad (29)$$

The conservation of total energy implies that the truncated reflector radiates the same total power beyond $\theta\tau$ as does the untruncated reflector.

$$\frac{1+\cos(2\alpha_T)}{\sin(2\alpha_T)} = \frac{1}{P^o(\theta_T)}\int_{\theta_{\max}}^{\theta_T} P^o(\psi)d\psi = B(\theta_T) \quad (30)$$

This equation must hold true for any truncation $\theta=\theta\tau$. It allows us to explicitly calculate $\alpha$, and with it $\phi$ and R, in closed form as functions of $\theta$, if $B(\theta)$, that is the integral of $P^o(\theta)$ is given in closed form. The conservation of total energy also implies that the untruncated reflector radiates the same total power as the bare source. This leads to the normalizing condition.

$$B(0) = \frac{1}{P^o(\theta)}\int_{\theta_{\max}}^{\theta} P^o(\psi)d\psi = 1 \quad (30)$$

This condition may be used to find $\theta^{max}$; it is equivalent to setting $\theta\tau=0$, $2\alpha\tau=\pi/2$ in Eq.(30). Solving Eq.(30) for $\alpha$ yields.

$$2\alpha = \arccos\left(\frac{B^2-1}{B^2+1}\right) \quad (32)$$

Substituting $\alpha=(\phi-\theta)/2$, yields the acceptance angle function $$\phi(\theta)=\theta=2\alpha. \quad (33)$$

From Eq.(25) the radius is given by $$R(\theta) = P^o(\theta)\frac{B^2+1}{2B}$$

These equations specify the shape of the reflector in a parametric polar representation for any desired angular power distribution $P^o(\theta)$. A straight forward calculation shows that Eq. (32) is indeed the solution of the differential equation (27). In fact, Eq.(27) was not needed for this derivation of the reflector shape. We have presented it only to show the consistency of the approach.

For example, to produce a constant irradiance on a plane parallel to the source we must have $P^o(\theta)=1/\cos^2(\theta)$ and thus $B(\theta)=\cos^2(\theta)(\tan(\theta)-\tan(\theta\max))$. Using Eq. (31), we find $\theta\max=-\pi/4$ so that $B(\theta)=\cos^2(\theta)\tan(\theta)+1$ with no undetermined constants.

Figure 11:
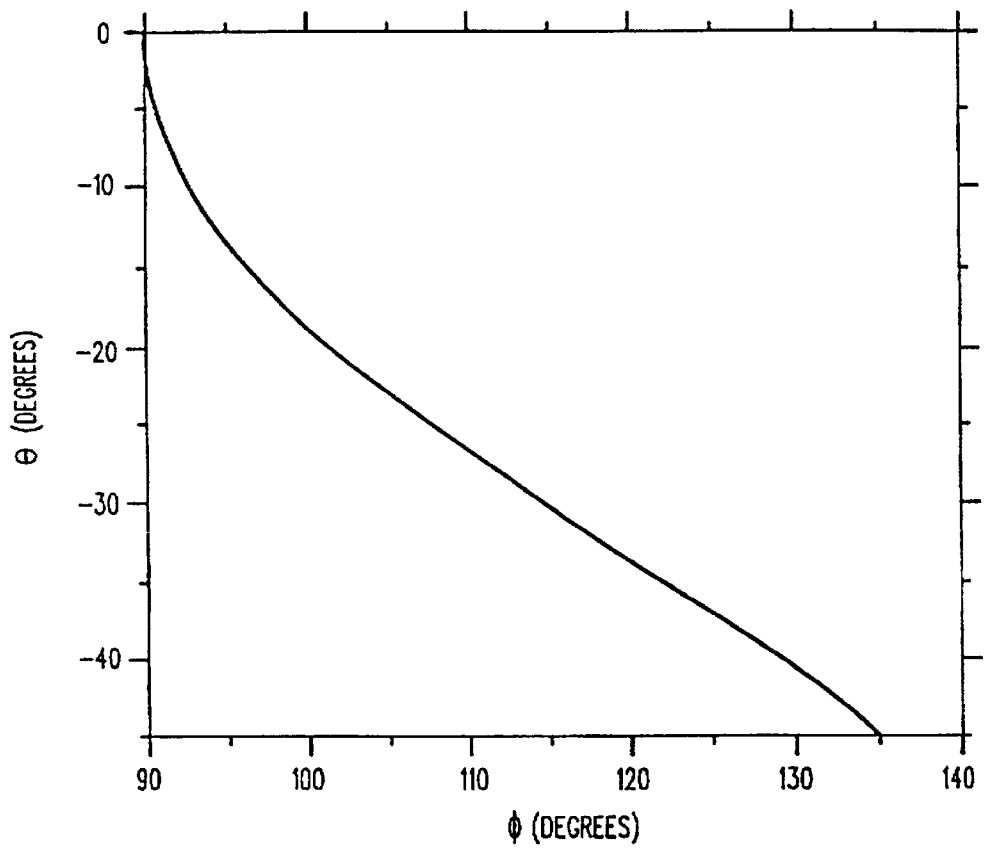
FIG. 11 illustrates an acceptance angle function which produces a constant irradiance on a distant plane from a finite one-sided lambertian strip source; there is only a CHC-type solution.
Figure 12:
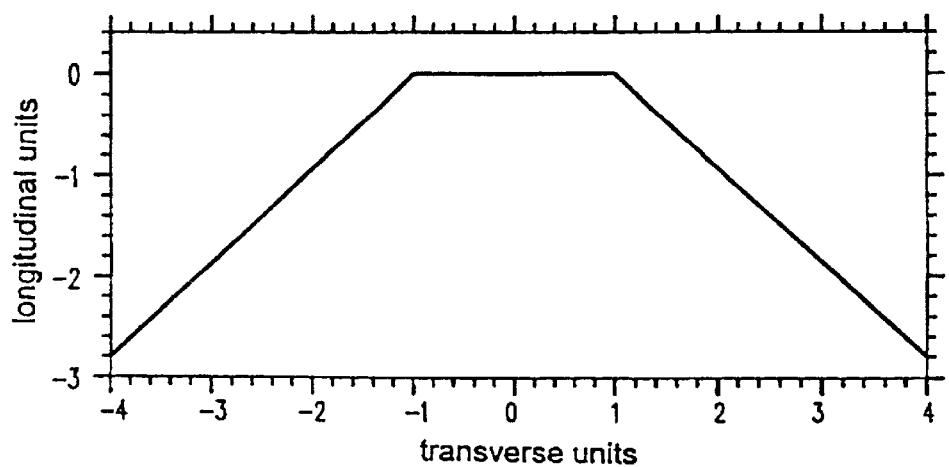
FIG. 12 shows a reflector profile which produces a constant irradiance on a distant plane from a finite one-side larnbertian strip source of width two units; note that there is only a CHC-type solution and it is truncated.
Figure 13:
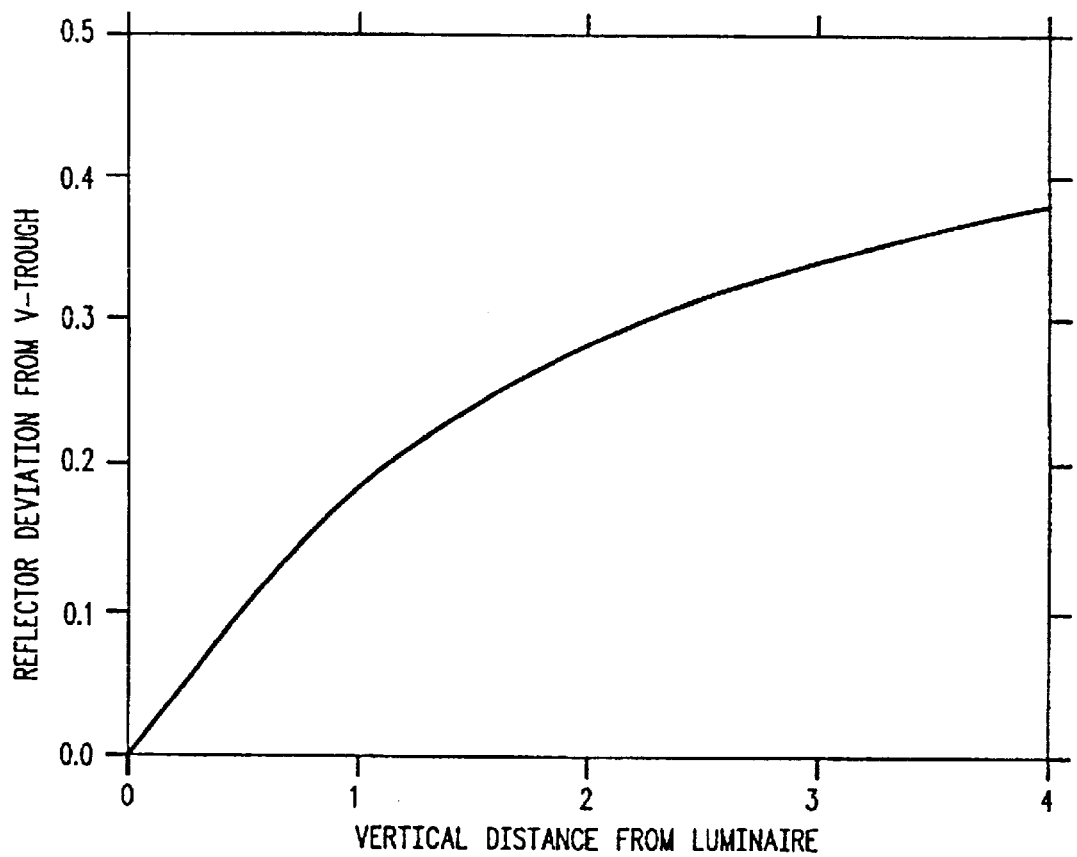
FIG. 13 illustrates a deviation of the reflector depicted in FIG. 12 from a true V-trough.
Figure 17:
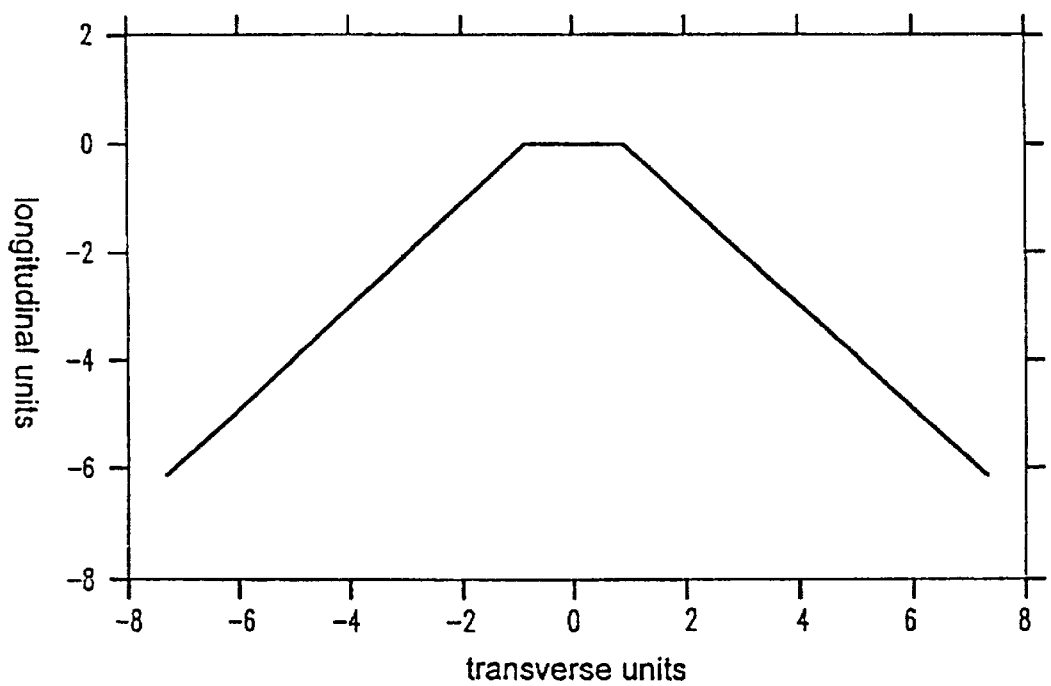
FIG. 17 illustrates a reflector profile which produces the desired irradiance shown in FIG. 13 on a distant plane from a finite one-sided lambertian strip source of width two units; note that there is only a CHC-type solution and it is truncated.

The resulting acceptance angle function and the reflector profile are shown in FIG. 11 and FIG. 17 respectively. The reflector shape is close to a V-trough. Though, the acceptance angle function is only poorly approximated by a straight fine, which characterizes the V-trough. In FIG. 13 we show the deviation of the reflector shape depicted in FIG.

12 from a true V-trough. Note, that a true V-trough produces a markedly non-constant irradiance distribution proportional to $\cos(\theta+\pi/4)\cos(\theta)$ for $0<-\theta<\pi/4$.

Figure 14:
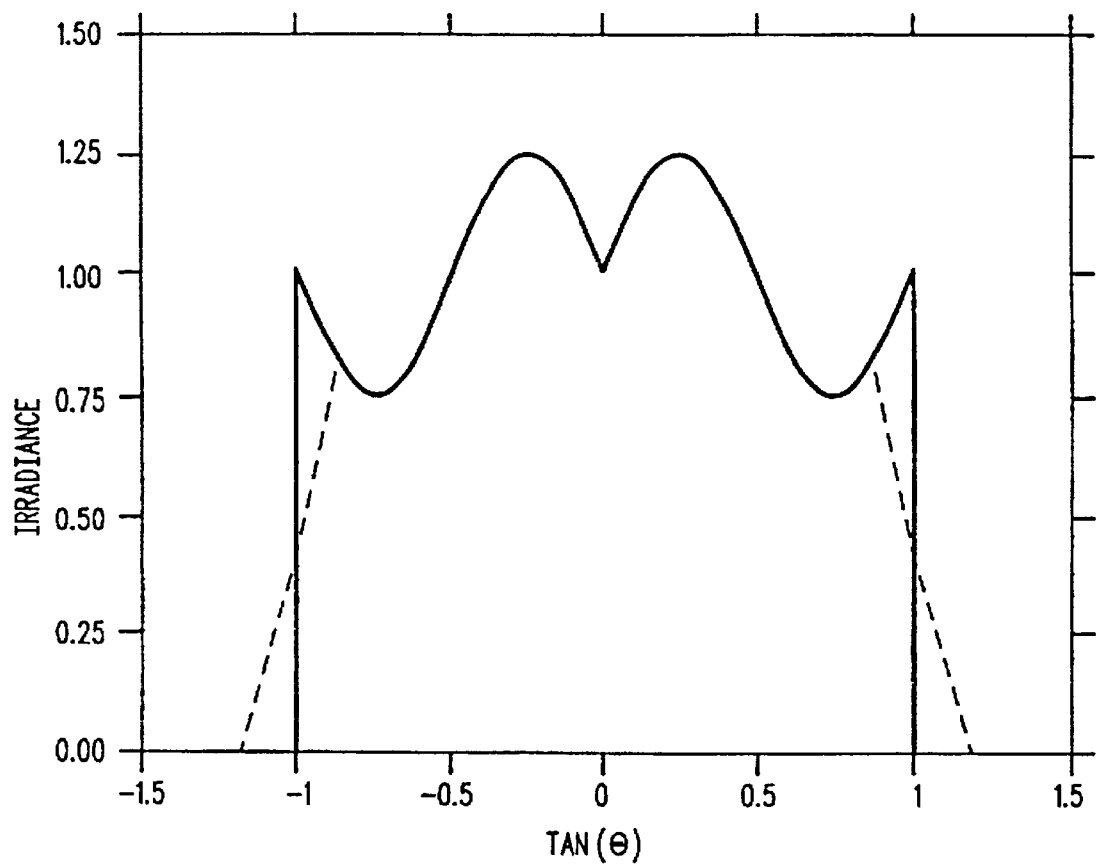
FIG. 14 shows a desired irradiance distribution on a distant plane perpendicular to the optical plane divided by the irradiance produced along the axis by the source alone; a broken line shows the irradiance of a truncated device.
Figure 15:
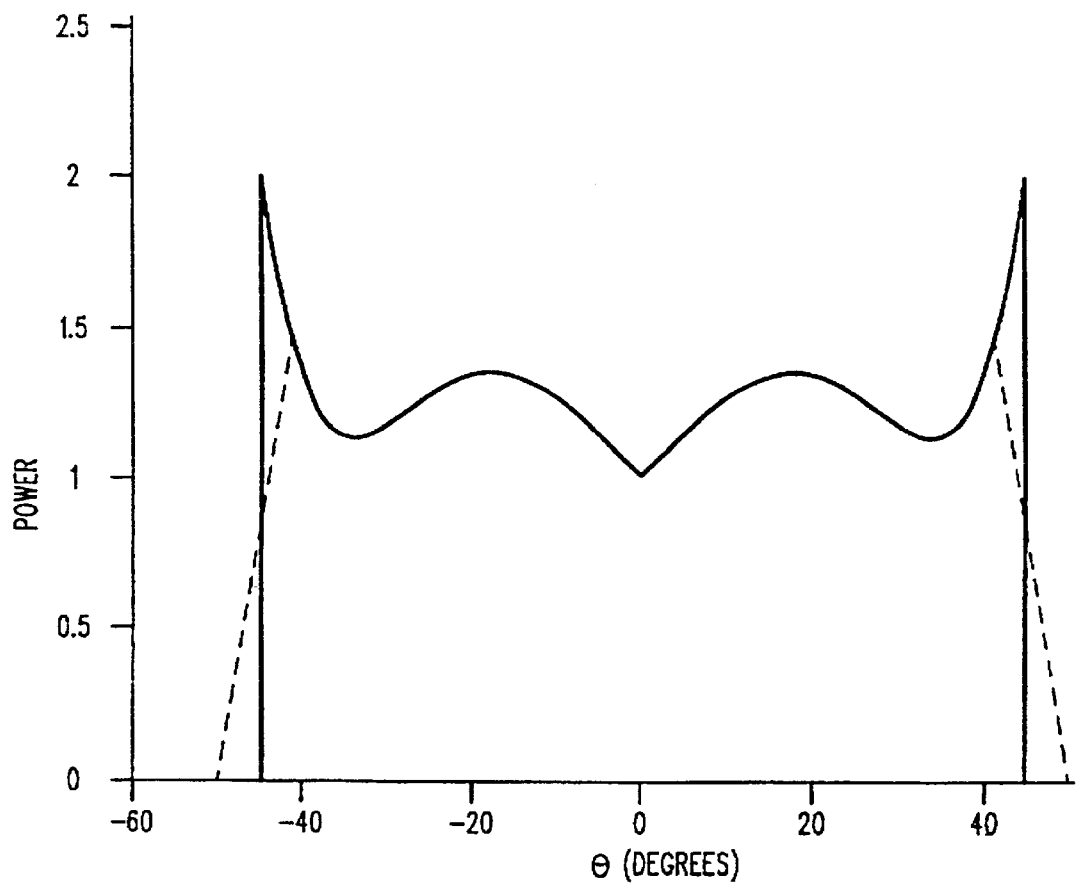
FIG. 15 illustrates an angular power distribution corresponding to the irradiance distribution shown in FIG. 13; a broken line refers to a truncated device.
Figure 16:
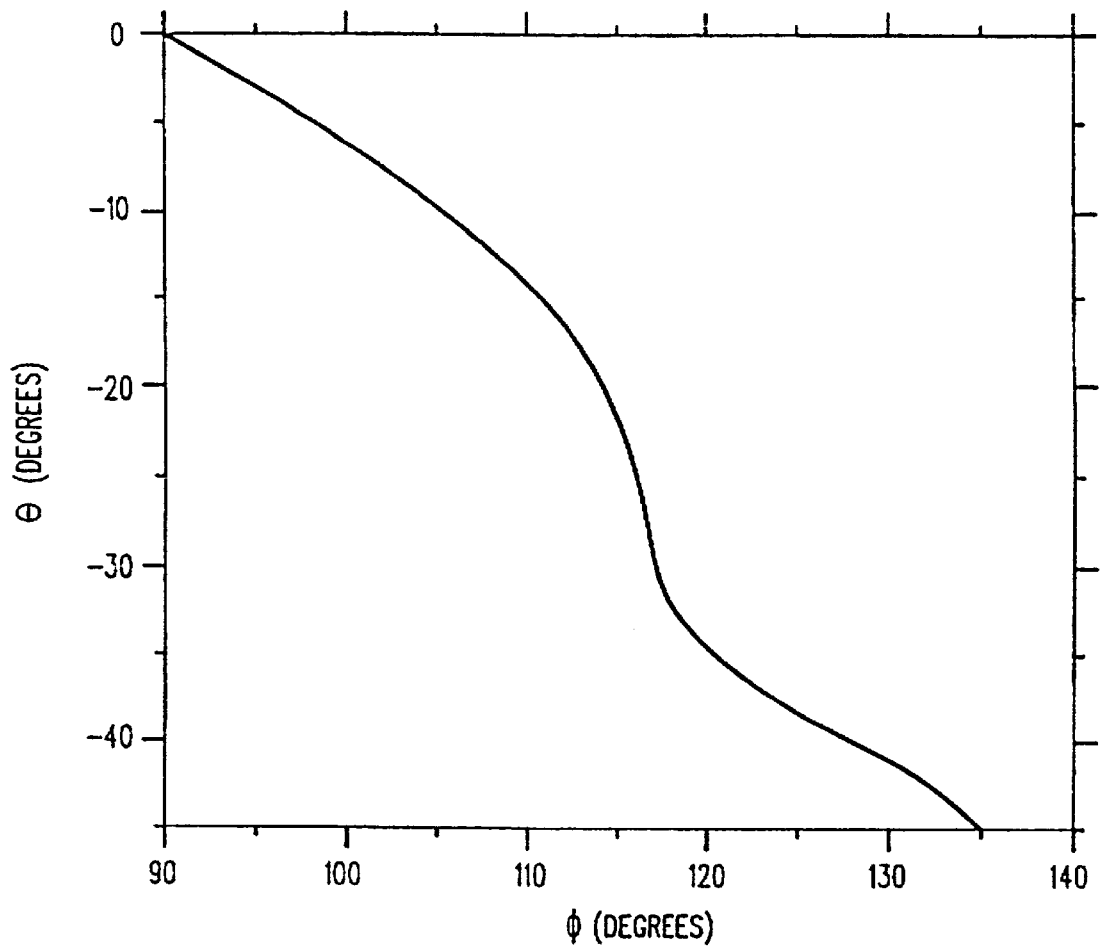
FIG. 16 shows an acceptance angle function corresponding to the desired irradiance distribution plotted in FIG. 13.

As a second example for a specific non-constant irradiance a reflector produces the irradiance distribution on a plane shown in FIG. 14. The corresponding angular power distribution is shown in FIG. 15. The acceptance angle function according to Eq.(33) and (32) and the resulting reflector shape according to Eq.(34) are visualized in FIG. 16 and FIG. 17.

Figure 18:
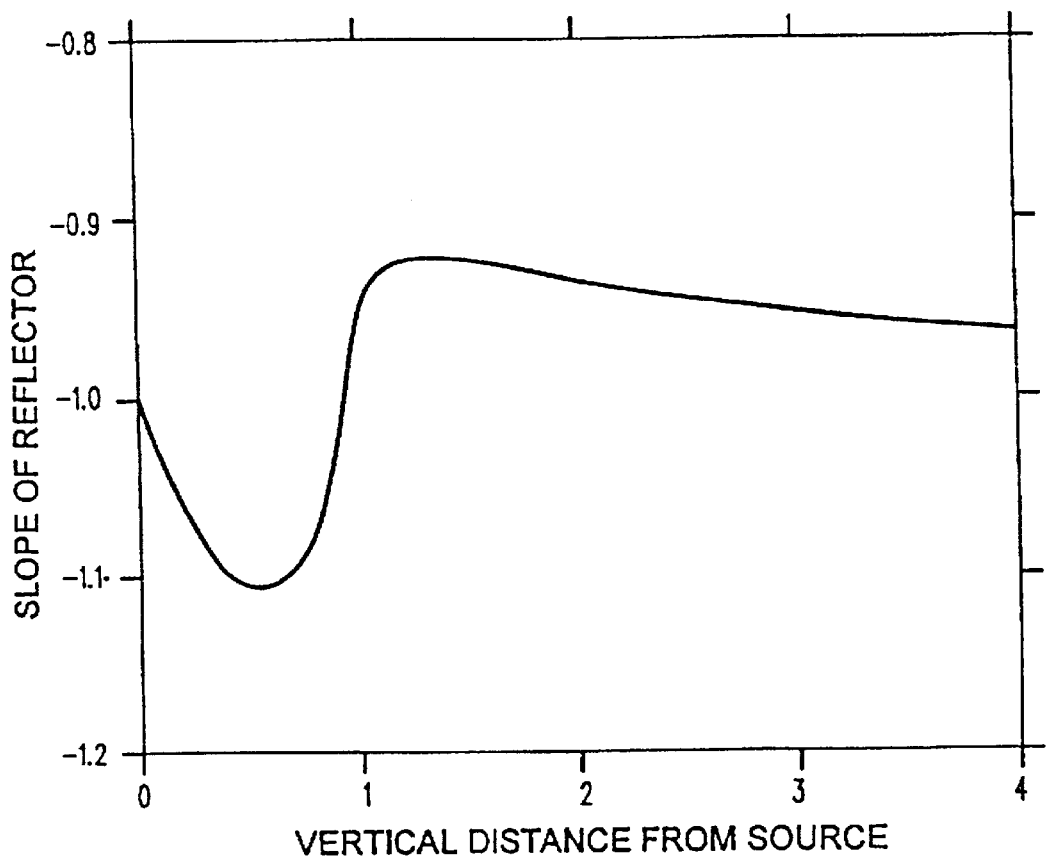
FIG. 18 shows the slope of the refector as a function of vertical distance from the source.
Figure 19:
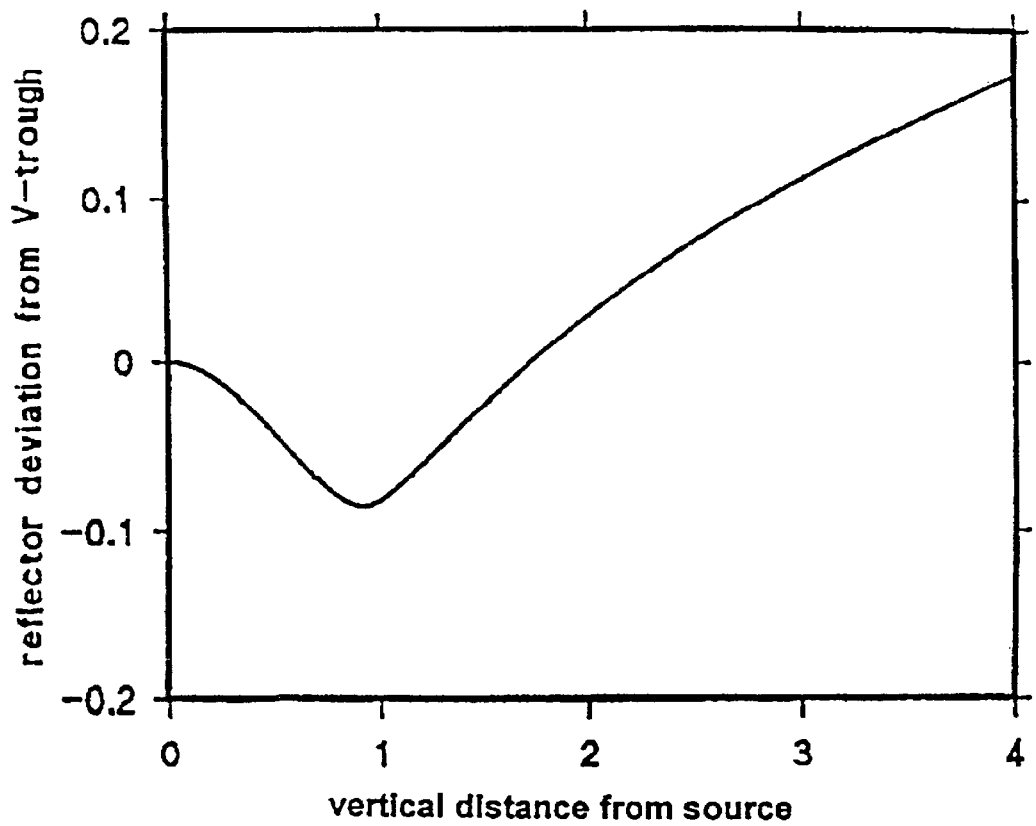
FIG. 19 illustrates the deviation of the reflector depicted in FIG. 16 from a true V-trough.

Although the desired irradiance in this example is significantly different from the constant irradiance treated in the example before, the reflector shape again superficially resembles a V-trough and the reflector of the previous example. The subtle difference between the reflector shape of this example and a true V-trough are visualized in FIG. 18 and FIG. 19 where we plot the slope of our reflector and the distance to a true V-trough. Most structure is confined to the region adjacent to the source. The fact that subtle variations in reflector shape have marked effects on the power and irradiance distribution of the device can be attributed to the large incidence angle with which the edge rays strike the outer parts of the reflector.

Figure 20:
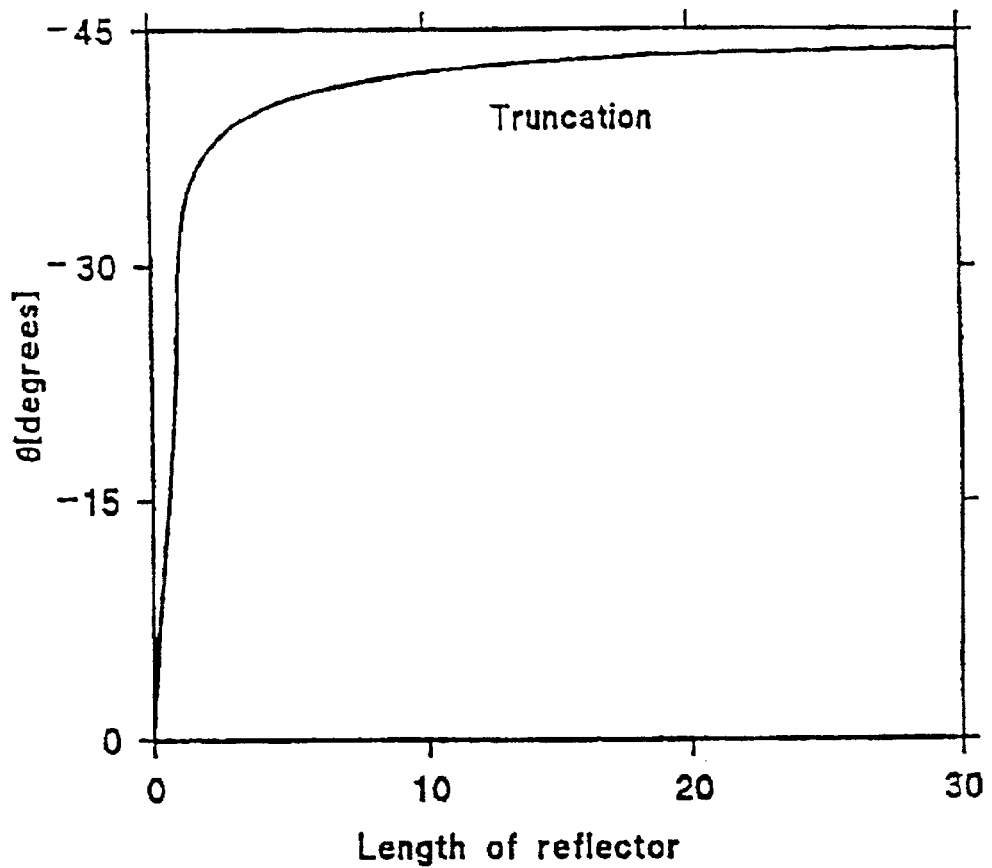
FIG. 20 shows the effect of truncation indicated by the angle up to which the truncated device matches the desired power distribution, and plotted as a function of the vertical length of the reflector.

As mentioned before, in general the reflector is of infinite size. Truncation alters, however, only the distribution in the outer parts. To illustrate the effects of truncation for the reflector of this example, we plot in FIG. 20 the angle up to which the truncated device matches the desired power distribution, as a function of the vertical length of the reflector. Thus for example the truncated device shown in FIG. 17 has the irradiance distribution and power distribution shown in broken line in FIG. 14 and FIG. 15. Note that the reflector truncated to a vertical length of 3 times the source width covers more than ⅚ of the angular range.

B. General Optical Sources

Figure 6A:
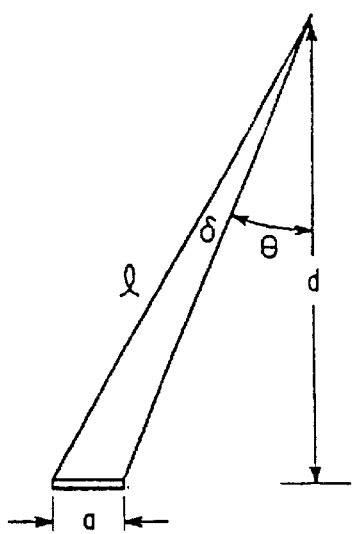
FIG. 6A shows a schematic of a two dimensional Lambertian source giving a $\cos^3 \theta$ illuminance distribution.
Figure 6D:
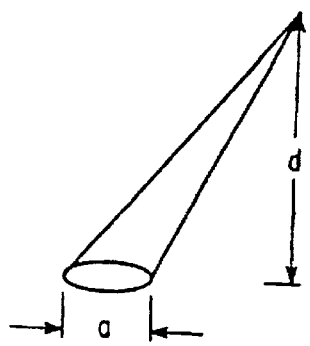
FIG. 6D illustrates a three dimensional Lambertian source giving a $\cos^4 \theta$ illuminance distribution.

Nonimaging illumination can also be provided by general optical sources provided the geometrical constraints on a reflector can be defined by simultaneously solving a pair of system. The previously recited equations (1) and (2) relate the source angle and angle of light reflection from a reflector surface, $$d/d\phi(\log R_i)=\tan(\phi_i-\theta_i)/2$$

and the second general expression of far field illuminance is, $$L(\theta_i) \cdot R_i \sin(\phi_i-\theta_i) G(\theta_i) = I(\theta_i)$$

where $L(\theta_i)$ is the characteristic luminance at angle $\theta_i$ and $G(\theta_i)$ is a geometrical factor which is a function of the geometry of the light source. In the case of a two dimensional Lambertian light source as illustrated in FIG. 6A, the throughput versus angle for constant illuminance varies as $\cos^2\theta$. For a three dimensional Lambertian light source shown in FIG. 6D, the throughput versus angle for constant illuminance varies as $\cos^3\theta$.

Figure 6C:
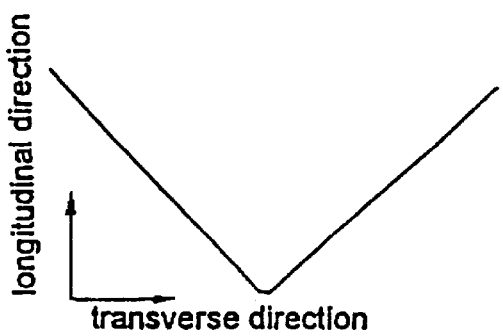
FIG. 6C illustrates the geometry of a nonimaging reflector providing uniform illuminance to $\theta=40°$ for the source of FIG. 6A.
Figure 6B:
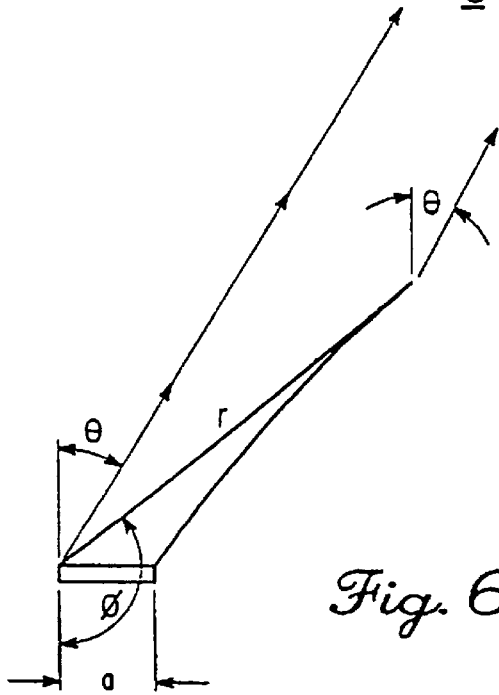
FIG. 6B shows a planar light source with the Lambertian source of FIG. 6A.

Considering the example of a two dimensional Lamberatian light source and the planar source illustrated in FIG. 6B, the concept of using a general light source to produce a selected far field illurninance can readily be illustrated. Notice with our sign convention angle $\theta$ in FIG. 6B is negative. In this example we will solve equations (18) and (19) simultaneously for a uniform far field illuminance using the two dimensional Lambertian source. In this example, equation (19) because, $$R_i \sin(\phi_i-\theta_i)\cos^2\theta_i = I(\theta_i)$$

Generally for a bare two dimensional Lambertian source, $$I(\theta_i) \sim \delta \cos\theta_i$$

$$\delta \sim a\cos\theta_i/l$$

$$l \sim d/\cos\theta$$

Therefore, $I \sim \cos^3\theta$.

In the case of selecting a uniform far field illumanance $I(\theta_i)=C$, and if we solve the equations at the end of the first paragraph of section B., $$d/d\phi(\log R_i)=\tan(\phi_i-\theta_i)/2 \text{ and}$$

$$\log R_i + \log \sin(\phi_i-\theta_i) + 2\log\cos\theta_i = \log C = \text{constant}$$

solving $d\phi_i/d\theta_i = -2\tan\theta_i \sin(\phi_i-\theta_i) - \cos(\phi_i-\theta_i)$ or let $\Psi_i = \phi_i - \theta_i$ $$d\Psi_i/d\theta_i = 1 + \sin\Psi_i - 2\tan\theta_i \cos\Psi_i$$

Figure 7A:
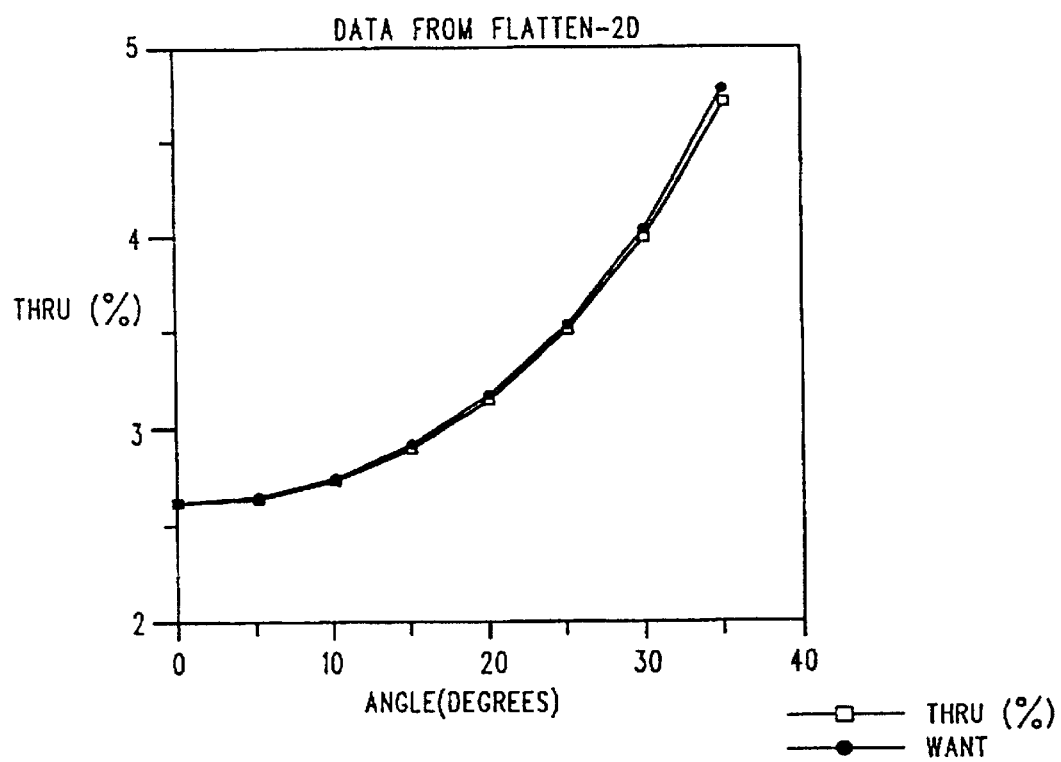
FIG. 7A shows a two dimensional solution ray trace analysis and FIG. 7B illustrates three empirical fits to the three dimensional solution.

Solving numerically by conventional methods, such as the Runge-Kutta method, starting at $\Psi_i=0$ at $\theta_i$, for the constant illuminance, $d\Psi_i/d\theta_i = 1 + \sin\Psi_i - n\tan\theta_i \cos\Psi_i$ where n is two for the two dimensional source. The resulting reflector profile for the two dimensional solution is shown in FIG. 6C and the tabulated data characteristic of FIG. 6C is shown in Table III. The substantially exact nature of the two dimensional solution is clearly shown in the ray trace fit of FIG. 7A. The computer program used to perform these selective calculation is included as Appendix B of the Specification. For a bare three dimensional Lambertian source where $I(\theta_i) \sim \cos^4\theta_i$, n is larger than 2 but less than 3.

Figure 7B:
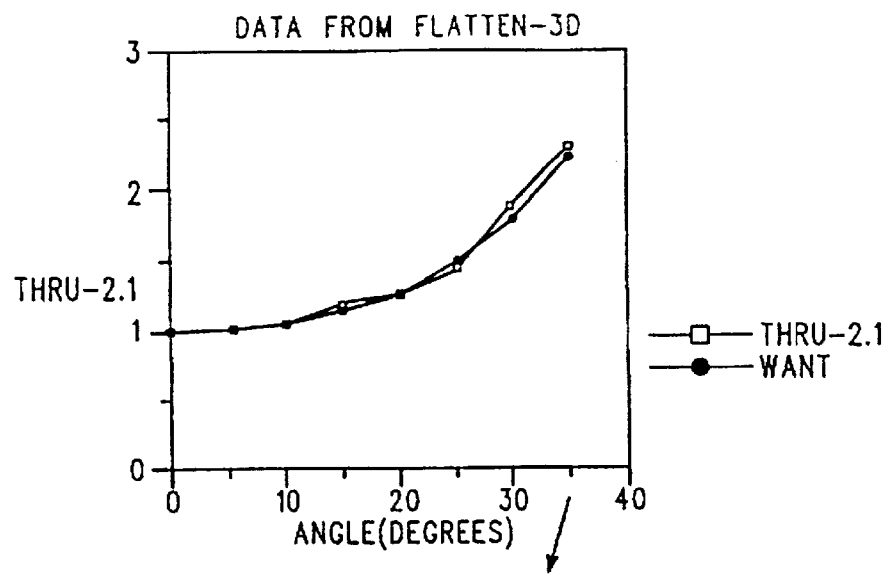
Figure 7B:
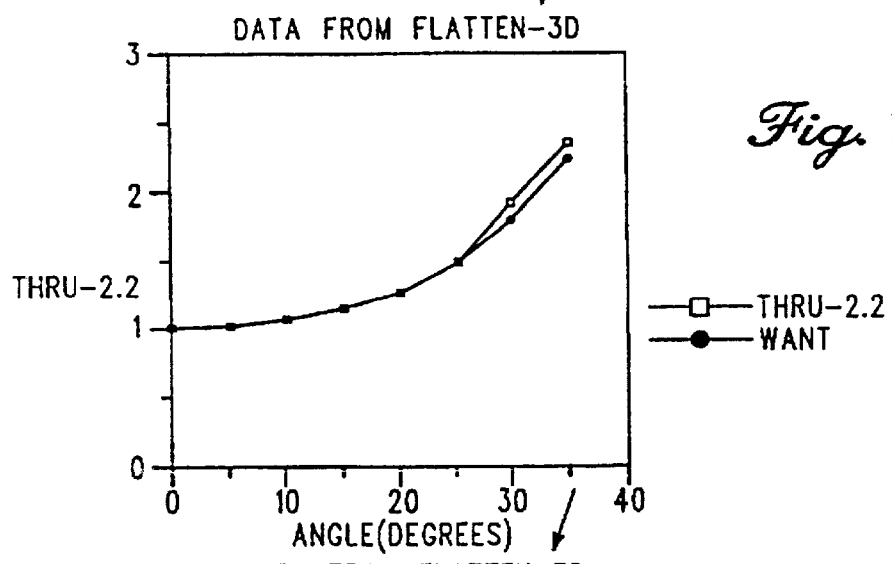
Figure 7B:
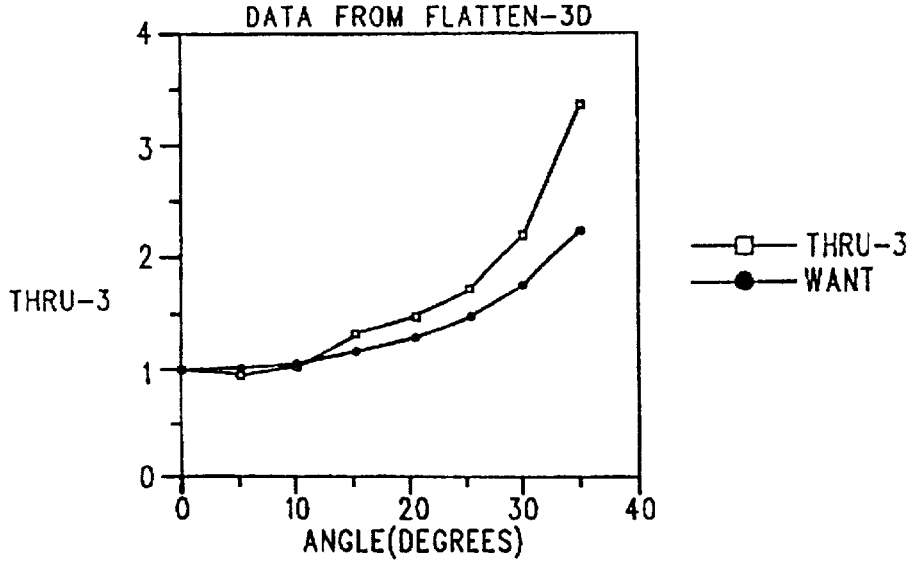

The ray trace fit for this three dimensional solution is shown in FIG. 7B wherein the "n" value was fitted for desired end result of uniform far field illuminance with the best fit being about n=2.1.

Other general examples for different illuminance sources include, (1) $I(\theta_i)=A\exp(B\theta_i)$ for a two dimensional, exponential illuminance for which one must solve the equation, $$d\Psi_i/d\theta_i = 1 + \sin\Psi_i - 2\tan\theta_i \cos\Psi + B$$

(2) $I(\theta_i)=A\exp(-B\theta_i^2/2)$ for a two dimensional solution for a Gaussian illuminance for which one must solve, $$d\Psi_i/d\theta_i = 1 + \sin\Psi_i - 2\tan\theta_i \cos\Psi_i - B\theta_i$$

The equations in the first paragraph of section B can of course be generalized to include any light source for any desired for field illuminance for which one of ordinary skill in the art would be able to obtain convergent solutions in a conventional manner.

A ray trace of the uniform beam profile for the optical device of FIG. 1 is shown in a tabular form of output in Table II below:

TABLE II

| | | | | | | | | | | | | | | |
|---|---|---|---|---|---|---|---|---|---|---|---|---|---|---|
| 114 | 202 | 309 | 368 | 422 | 434 | 424 | 608 | 457 | 448 | 400 | 402 | 315 | 229 | 103 |
| 145 | 295 | 398 | 455 | 490 | 576 | 615 | 699 | 559 | 568 | 511 | 478 | 389 | 298 | 126 |

TABLE II-continued

| | | | | | | | | | | | | | | |
|---|---|---|---|---|---|---|---|---|---|---|---|---|---|---|
| 153 | 334 | 386 | 465 | 515 | 572 | 552 | 622 | 597 | 571 | 540 | 479 | 396 | 306 | 190 |
| 202 | 352 | 393 | 452 | 502 | 521 | 544 | 616 | 629 | 486 | 520 | 432 | 423 | 352 | 230 |
| 197 | 362 | 409 | 496 | 496 | 514 | 576 | 511 | 549 | 508 | 476 | 432 | 455 | 335 | 201 |
| 241 | 377 | 419 | 438 | 489 | 480 | 557 | 567 | 494 | 474 | 482 | 459 | 421 | 379 | 230 |
| 251 | 364 | 434 | 444 | 487 | 550 | 503 | 558 | 567 | 514 | 500 | 438 | 426 | 358 | 231 |
| 243 | 376 | 441 | 436 | 510 | 526 | 520 | 540 | 540 | 482 | 506 | 429 | 447 | 378 | 234 |
| 233 | 389 | 452 | 430 | 489 | 519 | 541 | 547 | 517 | 500 | 476 | 427 | 442 | 344 | 230 |
| 228 | 369 | 416 | 490 | 522 | 501 | 539 | 546 | 527 | 481 | 499 | 431 | 416 | 347 | 227 |
| 224 | 359 | 424 | 466 | 493 | 560 | 575 | 553 | 521 | 527 | 526 | 413 | 417 | 320 | 205 |
| 181 | 378 | 392 | 489 | 485 | 504 | 603 | 583 | 563 | 530 | 512 | 422 | 358 | 308 | 194 |
| 150 | 326 | 407 | 435 | 506 | 567 | 602 | 648 | 581 | 535 | 491 | 453 | 414 | 324 | 179 |
| 135 | 265 | 382 | 450 | 541 | 611 | 567 | 654 | 611 | 522 | 568 | 446 | 389 | 300 | 130 |
| 129 | 213 | 295 | 364 | 396 | 404 | 420 | 557 | 469 | 435 | 447 | 351 | 287 | 206 | 146 |
| | ELEVATION | | | | | | | | | | | | | |

TABLE III

| Phi | Theta | r |
|---|---|---|
| 90.0000 | 0.000000 | 1.00526 |
| 90.3015 | 0.298447 | 1.01061 |
| 90.6030 | 0.593856 | 1.01604 |
| 90.9045 | 0.886328 | 1.02156 |
| 91.2060 | 1.17596 | 1.02717 |
| 91.5075 | 1.46284 | 1.03286 |
| 91.8090 | 1.74706 | 1.03865 |
| 92.1106 | 2.02870 | 1.04453 |
| 92.4121 | 2.30784 | 1.05050 |
| 92.7136 | 2.58456 | 1.05657 |
| 93.0151 | 2.85894 | 1.06273 |
| 93.3166 | 3.13105 | 1.06899 |
| 93.6181 | 3.40095 | 1.07536 |
| 93.9196 | 3.66872 | 1.08182 |
| 94.2211 | 3.93441 | 1.08840 |
| 94.5226 | 4.19810 | 1.09507 |
| 94.8241 | 4.45983 | 1.10186 |
| 95.1256 | 4.71967 | 1.10876 |
| 95.4271 | 4.97767 | 1.11576 |
| 95.7286 | 5.23389 | 1.12289 |
| 96.0302 | 5.48838 | 1.13013 |
| 96.3317 | 5.74120 | 1.13749 |
| 96.6332 | 5.99238 | 1.14497 |
| 96.9347 | 6.24197 | 1.15258 |
| 97.2362 | 6.49004 | 1.16031 |
| 97.5377 | 6.73661 | 1.16817 |
| 97.8392 | 6.98173 | 1.17617 |
| 95.1407 | 7.22545 | 1.18430 |
| 95.4422 | 7.46780 | 1.19256 |
| 95.7437 | 7.70883 | 1.20097 |
| 99.0452 | 7.94857 | 1.20952 |
| 99.3467 | 8.18707 | 1.21822 |
| 99.6482 | 8.42436 | 1.22707 |
| 99.9498 | 8.66048 | 1.23607 |
| 100.251 | 8.89545 | 1.24522 |
| 100.553 | 9.12933 | 1.25454 |
| 100.854 | 9.36213 | 1.26402 |
| 101.156 | 9.59390 | 1.27367 |
| 101.457 | 9.82466 | 1.28349 |
| 101.759 | 10.0545 | 1.29349 |
| 102.060 | 10.2833 | 1.30366 |
| 102.362 | 10.5112 | 1.31402 |
| 102.663 | 10.7353 | 1.32457 |
| 102.965 | 10.9645 | 1.33530 |
| 103.266 | 11.1899 | 1.34624 |
| 103.568 | 11.4145 | 1.35738 |
| 103.869 | 11.6383 | 1.36873 |
| 104.171 | 11.8614 | 1.38028 |
| 104.472 | 12.0837 | 1.39206 |
| 104.774 | 12.3054 | 1.40406 |
| 105.075 | 12.5264 | 1.41629 |
| 105.377 | 12.7468 | 1.42875 |
| 105.678 | 12.9665 | 1.44145 |
| 105.980 | 13.1857 | 1.45441 |
| 106.281 | 13.4043 | 1.46761 |
| | | 1.48108 |

TABLE III-continued

| Phi | Theta | r |
|---|---|---|
| 107.789 | 14.4898 | 1.53770 |
| 108.090 | 14.7056 | 1.55259 |
| 108.392 | 14.9209 | 1.56778 |
| 108.693 | 15.1359 | 1.58329 |
| 108.995 | 15.3506 | 1.59912 |
| 109.296 | 15.5649 | 1.61529 |
| 109.598 | 15.7788 | 1.63181 |
| 109.899 | 15.9926 | 1.64868 |
| 110.201 | 16.2060 | 1.66591 |
| 110.503 | 16.4192 | 1.68353 |
| 110.804 | 16.6322 | 1.70153 |
| 111.106 | 16.8450 | 1.71994 |
| 111.407 | 17.0576 | 1.73876 |
| 111.709 | 17.2701 | 1.75801 |
| 112.010 | 17.4824 | 1.77770 |
| 112.312 | 17.6946 | 1.79784 |
| 112.613 | 17.9068 | 1.81846 |
| 112.915 | 18.1188 | 1.83956 |
| 113.216 | 18.3309 | 1.86117 |
| 113.518 | 18.5429 | 1.88330 |
| 113.819 | 18.7549 | 1.90596 |
| 114.121 | 18.9670 | 1.92919 |
| 114.422 | 19.1790 | 1.95299 |
| 114.724 | 19.3912 | 1.97738 |
| 115.025 | 19.6034 | 2.00240 |
| 115.327 | 19.8158 | 2.02806 |
| 115.628 | 20.0283 | 2.05438 |
| 115.930 | 20.2410 | 2.08140 |
| 116.231 | 20.4538 | 2.10913 |
| 116.533 | 20.6669 | 2.13761 |
| 116.834 | 20.8802 | 2.16686 |
| 117.136 | 21.0938 | 2.19692 |
| 117.437 | 21.3076 | 2.22782 |
| 117.739 | 21.5218 | 2.25959 |
| 118.040 | 21.7362 | 2.29226 |
| 118.342 | 21.9511 | 2.32588 |
| 118.643 | 22.1663 | 2.36049 |
| 118.945 | 22.3820 | 2.39612 |
| 119.246 | 22.5981 | 2.43283 |
| 119.548 | 22.8146 | 2.47066 |
| 119.849 | 23.0317 | 2.50967 |
| 120.151 | 23.2493 | 2.54989 |
| 120.452 | 23.4674 | 2.59140 |
| 120.754 | 23.6861 | 2.63426 |
| 121.055 | 23.9055 | 2.67852 |
| 121.357 | 24.1255 | 2.72426 |
| 121.658 | 24.3462 | 2.77155 |
| 121.960 | 24.5676 | 2.82046 |
| 122.261 | 24.7898 | 2.87109 |
| 122.563 | 25.0127 | 2.92352 |
| 122.864 | 25.2365 | 2.97785 |
| 123.166 | 25.4611 | 3.03417 |
| 123.467 | 25.6866 | 3.09261 |
| 123.769 | 25.9131 | 3.15328 |
| 124.070 | 26.1406 | 3.21631 |
| 124.372 | 26.3691 | 3.28183 |

TABLE III-continued

| Phi | Theta | r |
|---|---|---|
| 124.673 | 26.5986 | 3.34999 |
| 124.975 | 26.8293 | 3.42097 |
| 125.276 | 27.0611 | 3.49492 |
| 125.578 | 27.2941 | 3.57205 |
| 125.879 | 27.5284 | 3.65255 |
| 126.181 | 27.7640 | 3.73666 |
| 126.482 | 28.0010 | 3.82462 |
| 126.784 | 28.2394 | 3.91669 |
| 127.085 | 28.4793 | 4.01318 |
| 127.387 | 28.7208 | 4.11439 |
| 127.688 | 28.9638 | 4.22071 |
| 127.990 | 29.2086 | 4.33250 |
| 128.291 | 29.4551 | 4.45022 |
| 128.593 | 29.7034 | 4.57434 |
| 128.894 | 29.9536 | 4.70540 |
| 129.196 | 30.2059 | 4.84400 |
| 129.497 | 30.4602 | 4.99082 |
| 129.799 | 30.7166 | 5.14662 |
| 130.101 | 30.9753 | 5.31223 |
| 130.402 | 31.2365 | 5.48865 |
| 130.704 | 31.5000 | 5.67695 |
| 131.005 | 31.7662 | 5.87841 |
| 131.307 | 32.0351 | 6.09446 |
| 131.608 | 32.3068 | 6.32678 |
| 131.910 | 32.5815 | 6.57729 |
| 132.211 | 32.8593 | 6.84827 |
| 132.513 | 33.1405 | 7.14236 |
| 132.814 | 33.4251 | 7.46272 |
| 133.116 | 33.7133 | 7.81311 |
| 133.417 | 34.0054 | 8.19804 |
| 133.719 | 34.3015 | 8.62303 |
| 134.020 | 34.6019 | 9.09483 |
| 134.322 | 34.9068 | 9.62185 |
| 134.623 | 35.2165 | 10.2147 |
| 134.925 | 35.5314 | 10.8869 |
| 135.226 | 35.8517 | 11.6561 |
| 135.528 | 36.1777 | 12.5458 |
| 135.829 | 36.5100 | 13.5877 |
| 136.131 | 36.8489 | 14.8263 |
| 136.432 | 37.1949 | 16.3258 |
| 136.734 | 37.5486 | 18.1823 |
| 137.035 | 37.9106 | 20.5479 |
| 137.337 | 38.2816 | 23.6778 |
| 137.638 | 38.6625 | 28.0400 |
| 137.940 | 39.0541 | 34.5999 |
| 138.241 | 39.4575 | 45.7493 |
| 138.543 | 39.8741 | 69.6401 |
| 138.844 | 40.3052 | 166.255 |
| 139.146 | 40.7528 | 0.707177E-01 |
| 139.447 | 41.2190 | 0.336171E-01 |
| 139.749 | 41.7065 | 0.231080E-01 |
| 140.050 | 42.2188 | 0.180268E-01 |
| 140.352 | 42.7602 | 0.149969E-01 |
| 140.653 | 43.3369 | 0.129737E-01 |
| 140.955 | 43.9570 | 0.115240E-01 |
| 141.256 | 44.6325 | 0.104348E-01 |
| 141.558 | 45.3823 | 0.958897E-02 |
| 141.859 | 46.2390 | 0.891727E-02 |
| 142.161 | 47.2696 | 0.837711E-02 |
| 142.462 | 48.6680 | 0.794451E-02 |
| 142.764 | 50.0816 | 0.758754E-02 |
| 143.065 | 48.3934 | 0.720659E-02 |
| 143.367 | 51.5651 | 0.692710E-02 |
| 143.668 | 51.8064 | 0.666772E-02 |
| 143.970 | 56.1867 | 0.647559E-02 |
| 144.271 | 55.4713 | 0.628510E-02 |
| 144.573 | 54.6692 | 0.609541E-02 |
| 144.874 | 53.7388 | 0.590526E-02 |
| 145.176 | 52.5882 | 0.571231E-02 |
| 145.477 | 50.8865 | 0.550987E-02 |
| 145.779 | 53.2187 | 0.534145E-02 |
| 146.080 | 52.1367 | 0.517122E-02 |
| 146.382 | 50.6650 | 0.499521E-02 |
| 146.683 | 49.5225 | 0.481649E-02 |
| 146.985 | 45.6312 | 0.459624E-02 |
| 147.286 | 56.2858 | 0.448306E-02 |
| 147.588 | 55.8215 | 0.437190E-02 |
| 147.889 | 55.3389 | 0.426265E-02 |
| 148.191 | 54.8358 | 0.415518E-02 |
| 148.492 | 54.3093 | 0.404938E-02 |
| 148.794 | 53.7560 | 0.394512E-02 |
| 149.095 | 53.1715 | 0.384224E-02 |
| 149.397 | 52.5498 | 0.374057E-02 |
| 149.698 | 51.8829 | 0.363992E-02 |
| 150.000 | 51.1597 | 0.354001E-02 |

C. Extended, Finite Size Sources

In this section we demonstrate how compact CEC-type reflectors can be designed to produce a desired irradiance distribution on a given target space from a given, finite size, source. The method is based on tailoring the reflector to a family of edge-rays, but at the same time the edge rays of the reflected source image are also controlled.

In order to tailor edge rays in two dimensions, for example, one can assume a family of edge rays, such as are produced by a luminaire source. Through each point in the space outside the luminaire source there is precisely one edge ray. The direction of the edge rays is a continuous and differentiable (vector) function of position. If we have a second, tentative family of edge-rays represented by another continuous vector function in the same region of space, we can design a reflector which precisely reflects one family onto the other. Each point in space is the intersection of precisely one member of each family. Therefore, the inclination of the desired reflector in each point in space can be calculated in a conventional, well known manner. Thus, one can derive a differential equation which uniquely specifies the reflector once the starting point is chosen.

We can, for example, formalize this idea for the case where the tentative family of edge rays is given only along a reference line which is not necessarily a straight line. This pertains to the usual problems encountered in solving illumination requirements.

Figure 21:
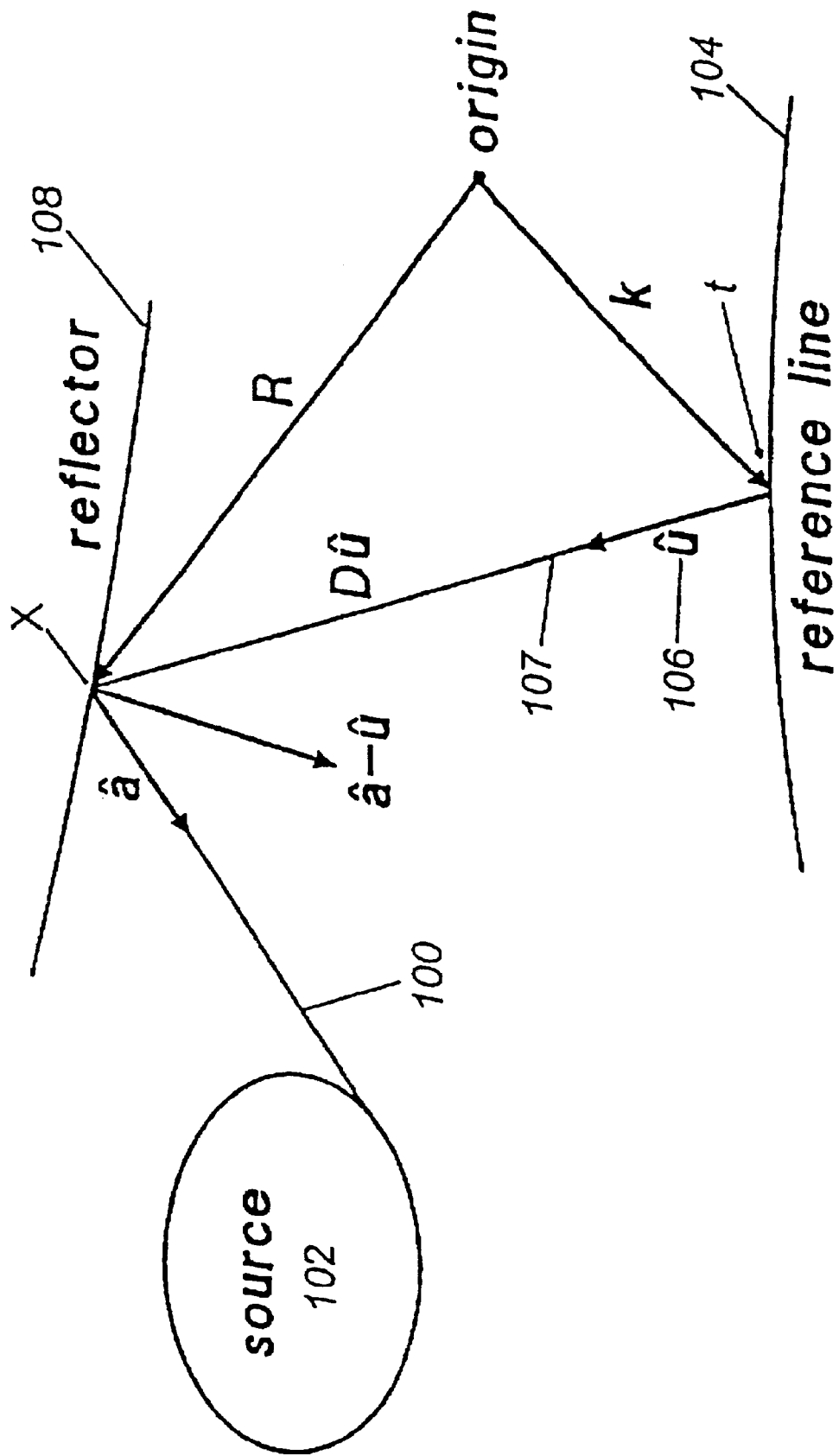
FIG. 21 illustrates a light source and family of edge rays given along a reference line with identifying vectors.

Referring to FIG. 21, let a=a(x) be the two dimensional unit vector 100 pointing towards the edge of a source 102 as seen from a point x, where k=k(t) is a parametrization of reference line 104 according to a scalar parameter t. Let u(t) be a unit vector 106 pointing in the direction of an edge ray 107 desired at the reference location specified by t. We can parametrize the contour of a reflector 108 with respect to the reference line 104 by writing the points on the reflector 108 as:

$$R(t)=k(t)+Du(t) \tag{35}$$

Here the scalar D denotes the distance from a point on the reference line 104 to the reflector 108 along the desired edge ray 107 through this point.

Designing the shape of the reflector 108 in this notation is equivalent to specifying the scalar function D=D(t). An equation for D is derived from the condition that the reflector 108 should reflect the desired edge ray 107 along u(t) into the actual edge ray a(R(t)) and vice versa:

$$\frac{dR(t)}{dt} \text{ is perpendicular to } (a(R(t))-u(t)) \tag{36}$$

Inserting Eq. (35) from above yields:

$$\frac{dD}{dt} = \frac{dk(t)/dt \cdot (a-u) + D(du/dt) \cdot a}{1 - a \cdot u} \quad (37)$$

Here the dots indicate scalar products. Equation (37) is a scalar differential equation for the scalar function D(t). By solving this equation, we can determine the reflector 108 which tailors the desired family of the edge ray 107 specified by the unit vector, u, 106 to the source 102 characterized by the vector function, a.

This approach can also be used to tailor one family of the edge rays 107 onto another with refractive materials rather then reflectors. Equation (36) then is replaced by Snell's law.

Consequently, the condition for the existence of a solution in this embodiment is that each point on the reflector 108 is intersected by precisely one member of the family of tentative edge rays. To be able to define this family of edge rays 107 along the reference line 104, each point on the reference line 104 must also be intersected by precisely one tentative edge ray. This is less than the requirement that the tentative edge rays define a physical surface which produces them. The family of the edge rays 107 of a physical contour (for example right edge rays) must also satisfy the further requirement that precisely one edge ray passes through each point of the entire space exterior to the contour. Indeed we can produce families of such edge rays by tailoring, but which cannot be produced by a single physical source. This is confirmed by observations that curved mirrors produce not only a distorted image of the source, but furthermore an image is produced that appears to move as the observer moves.

The condition that each point on the reflector 108, as well as each point on the reference line 104, should be intersected by precisely one of the desired edge rays 107 implies that the caustic formed by these edge rays 107 cannot intersect the reflector 108 or the reference line 104. The caustic must therefore either be entirely confined to the region between the reflector 108 and the reference line 104, or lie entirely outside this region. The first of these alternatives characterizes the CEC-type solutions, while the second one defines CHC-type solutions.

In order to determine the desired edge rays 107, the irradiance, for example, from a Lambertian source of uniform brightness B is given by its projected solid angle, or view factor. In a conventional, known manner the view factor is calculated by projecting the source 102 first on a unit sphere surrounding the observer (this yields the solid angle) and then projecting the source 102 again onto the unit circle tangent to the reference plane. The view factor is determined by the contour of the source 102 as seen by the observer. In two dimensions for example, the irradiance E is, $$E = B(\sin r_R - \sin r_L) \quad (38)$$

where $r_R$ and $R_L$ are the angles between the normal to the reference line and the right and left edge rays striking the observer, respectively. If we know the brightness B, the desired irradiance E and one edge ray, then Eq. (38) can be used to determine the desired direction of the other edge ray.

Figure 22B:
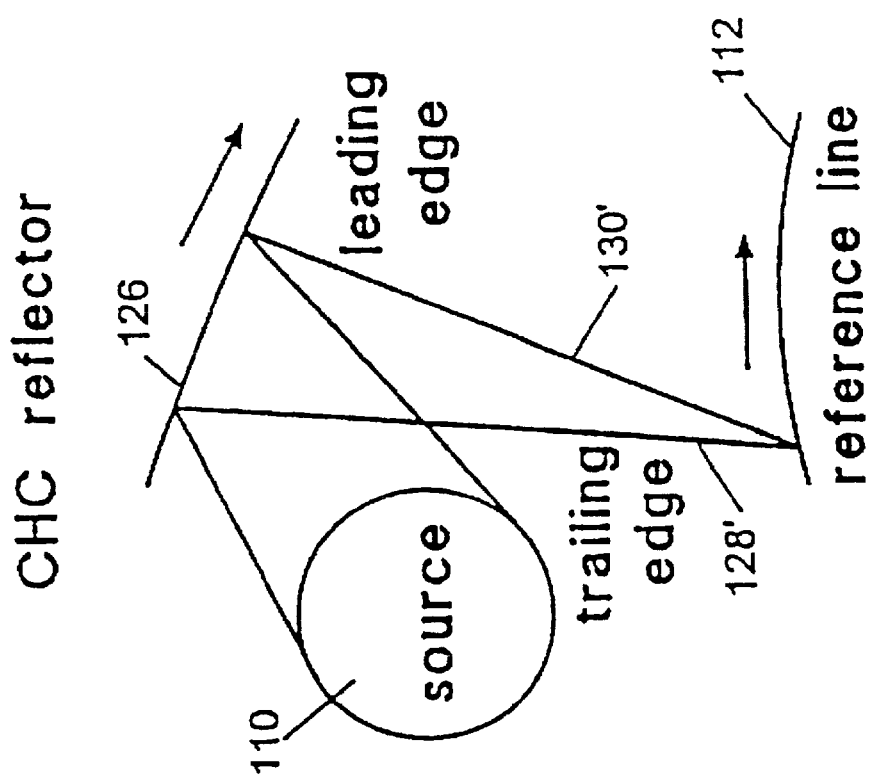
FIG. 22B is for a CHC reflector.

Consider the example of a source 110 of given shape (see FIG. 22). We then know the direction of the edge rays as seen by an observer as a function of the location of the observer. The shape of the source 110 can be defined by all its tangents. We can now design the reflector 108 so that it reflects a specified irradiance distribution onto the given reference line 104 iteratively.

Figure 22A:
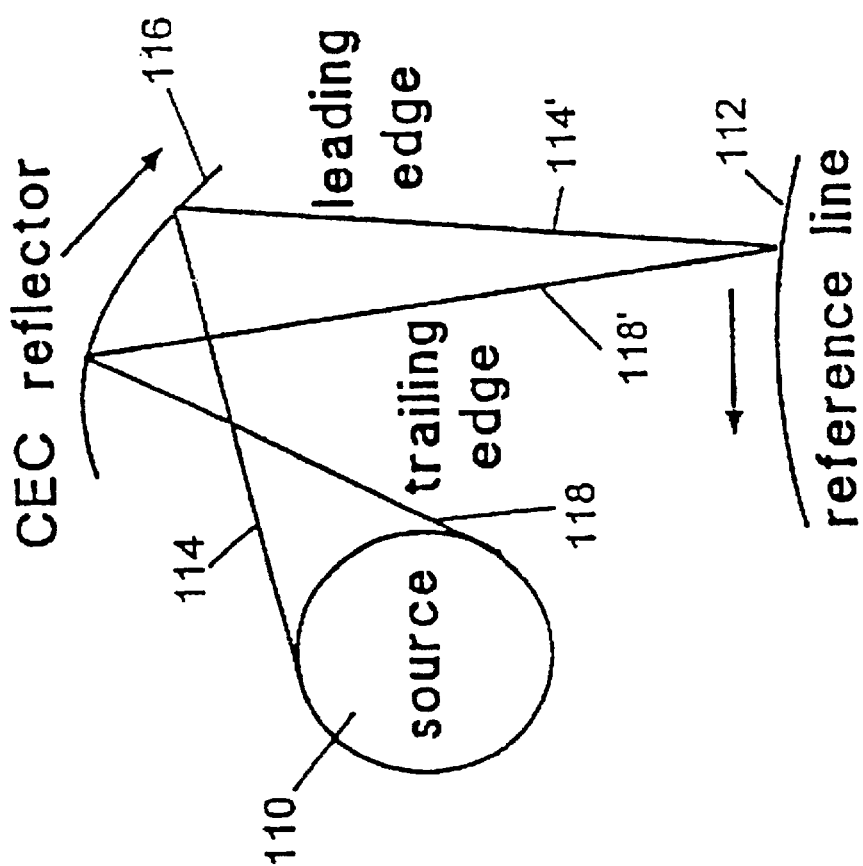
FIG. 22A illustrates a source, reflector, reference line and edge rays for a CEC reflector

In this iterative process if an observer proceeds, for example, from right to left along reference line 112, the perceived reflection moves in the opposite direction for a CEC-type solution. As shown in FIG. 22A a right edge ray 114 as seen by the observer, is the reflection of the right edge, as seen from reflector 116, and further plays the role of leading edge ray 114' along the reflector 116. A left edge ray 118 is just trailing behind, and this is shown in FIG. 22A as reflected trailing edge ray 118'. For a CHC-type reflector 126 (see FIG. 22B) the reflected image of the source 110 moves in the same direction as the observer, and the right edge as seen by the observer is the reflection of the left edge. If part of the reflector 126 is known, then a trailing edge ray 128' which has been reflected by the known part of the reflector 126, can be calculated as a function of location on the reference line 112. Equation (38) consequently specifies the direction of leading edge ray 130. Then, Eq. (37) can be solved to tailor the next part of the reflector profile to this leading edge ray 130.

Figure 23:
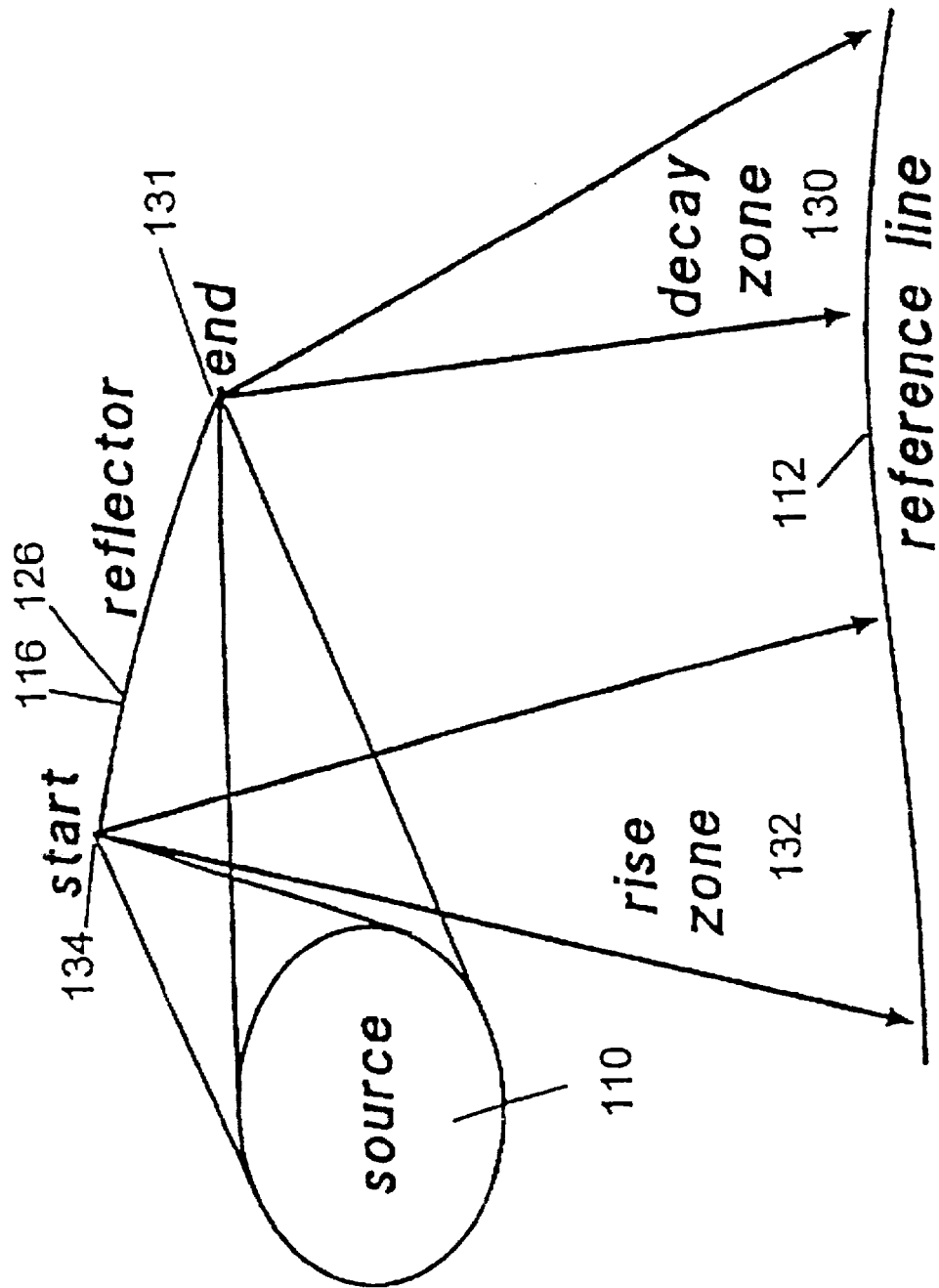
FIG. 23 illustrates the effect of termination of the reflector on boundary illumination.

Considering the boundary conditions, if the reflector 116 or 126 is terminated, then the reflected radiation does not terminate where the leading edge from the end of the reflector 116 or 126 strikes the reference line 112. Rather the reflected radiation ends where the trailing edge from the end of the reflector 116 or 126 strikes the reference line 112 (see FIG. 23). Thus, there is a 'decay' zone 131 on the reference line 112 which subtends an equal angle at the source 110 as seen from the end of the reflector 116 or 126. In this region the previously leading edge is at an end location 129 of the reflector 116 or 126, while the trailing edge gradually closes in. An analogous 'rise' zone 132 exists at the other end of the reflector 116, 126, where the trailing edge is initially fixed to a 'start' position 134 of the reflector 116. However, there is an important conceptual difference between these two regions, in that the 'rise' of the irradiance can be modeled by tailoring the reflector 116, 126 to the leading edge, while the 'decay' cannot be influenced once the reflector 116, 126 is terminated. Therefore, there is a difference in which way we can proceed in the iterative tailoring of the reflector 116, 126.

Figure 24:
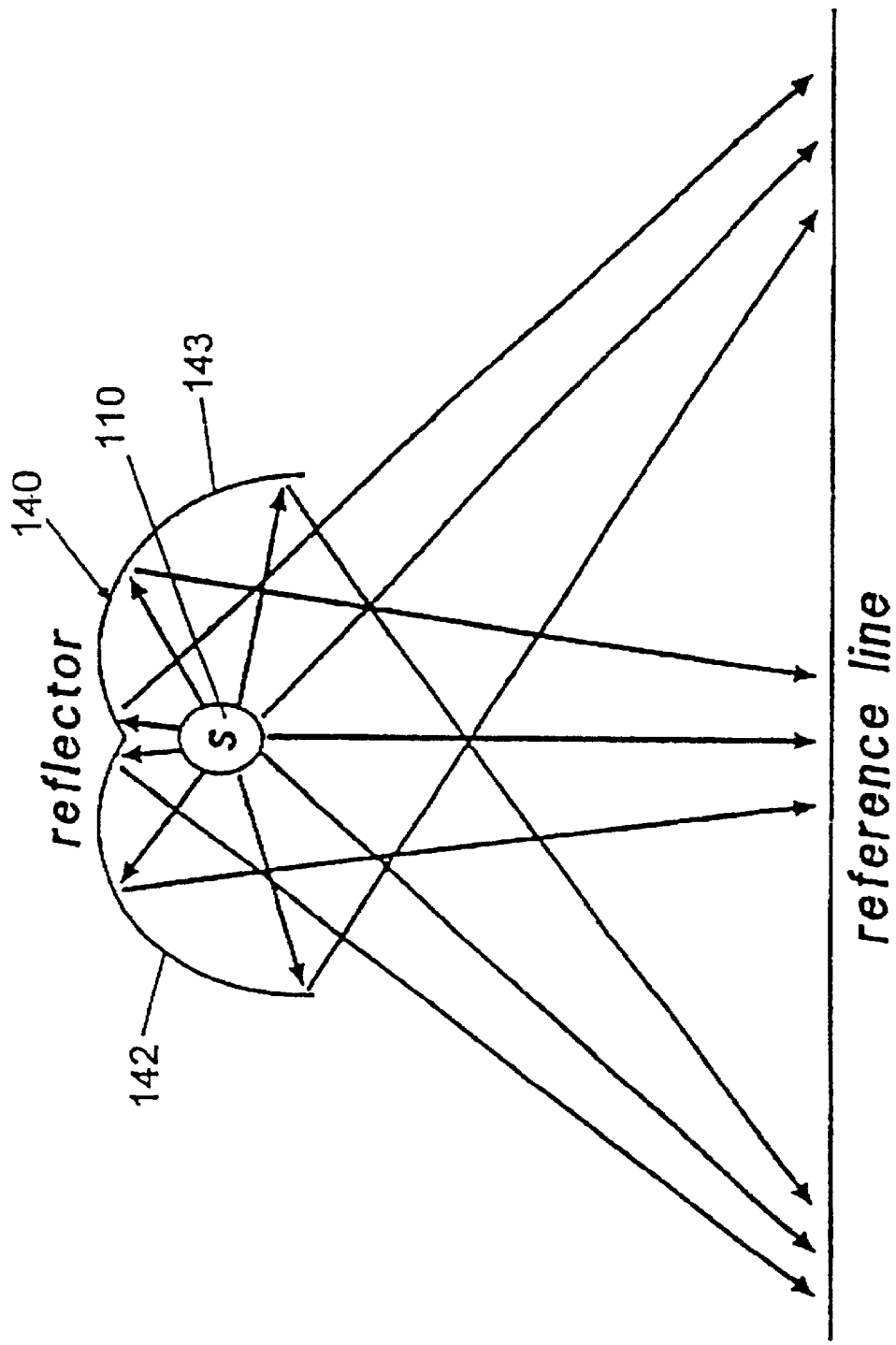
FIG. 24 shows a reflector for illumination of both sides of a target zone.

If the source 110 radiates in all directions and we want to avoid trapped radiation (that is radiation reflected back onto the source 110), then the reflected radiation from each side of the reflector 140 should cover the whole target domain of the reflector 140 (see FIG. 24). At the same time, the normal to the reflector surface should not intersect the source 110. Therefore, left and right side portions 142 and 143, respectively, of the reflectors 140 are joined in a cusp. An observer in the target domain thus perceives radiation from two distinct reflections of the source 110, one in each of the portions 142 and 143 of the reflector 140, in addition to the direct radiation from the source 110.

If we assume symmetry as shown in FIG. 24 and that the reflector 140 is preferred to be continuous and differentiable (except for the cusp in the symmetry plane), then we require that as seen from the symmetry plane, the two perceived reflections are equal. For all other points in the target domain we now have the additional degree of freedom of choosing the relative contributions of each of the portions 142 and 143 of the reflector 140. In CEC-type solutions both reflections appear to be situated between the target space and the reflector 140. Thus, as the observer moves, both reflection images move in the opposite direction. To that end, when the observer approaches the outermost part of the illuminated target region, the reflection on the same side first disappears at the cusp in the center. Thereafter, the reflection opposite to the observer starts to disappear past the outer edge of the opposite reflector, while the source itself is shaded by the outer edge of the other reflector portion on the observer side. These events determine the end point of the reflector 140 because now the total radiation in the target region equals the total radiation emitted by the source 110.

CEC-Type Reflector for Constant Irradiance

Figure 25:
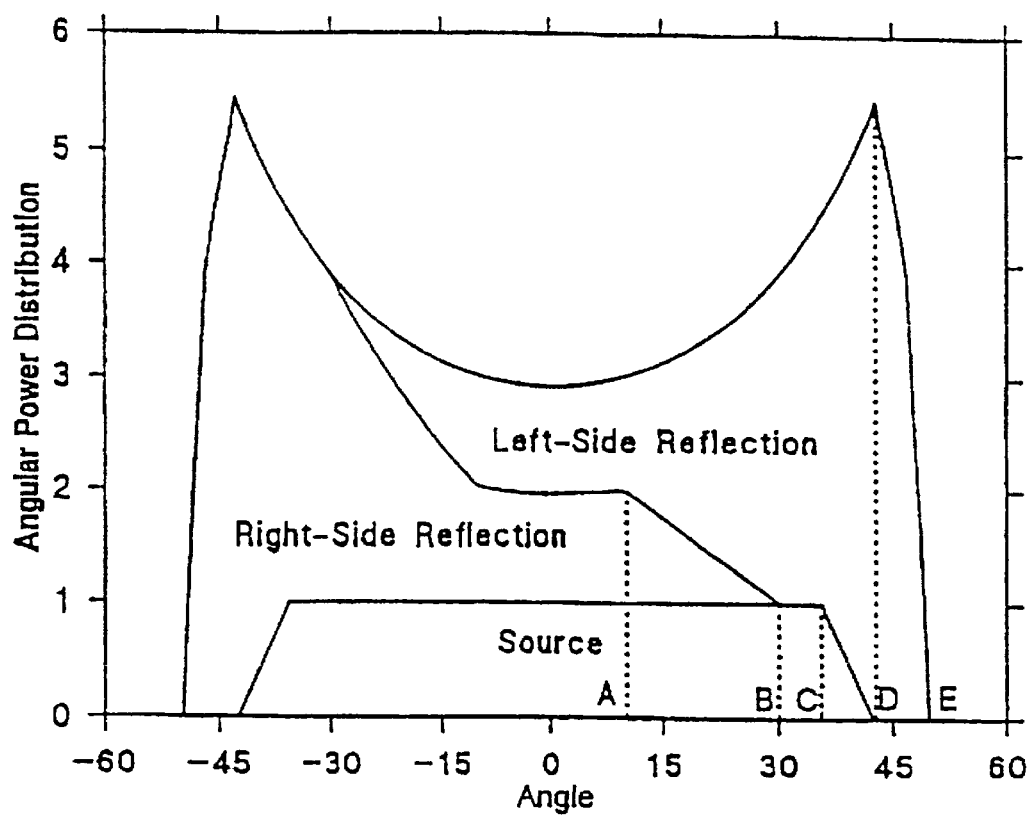
FIG. 25 shows irradiance as a function of angle on a distant plane from a finite cylindrical source of uniform brightness.
Figure 26:
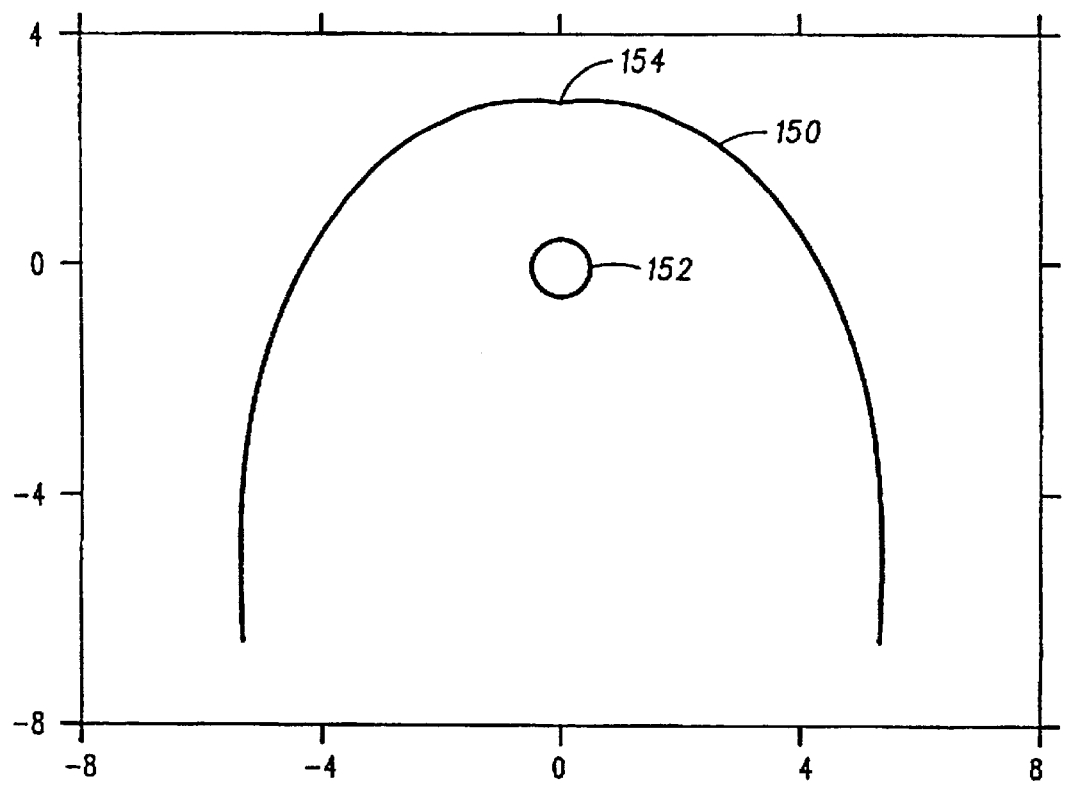
FIG. 26 shows a CEC-type reflector profile producing a constant irradiance on a distant plane from a cylindrical source.

A CEC-type reflector 150 can produce a constant irradiance on a distant plane from a finite size cylindric source 152 of uniform brightness. This requires the angular power distribution to be proportional to $1/\cos^2(\theta)$. In FIG. 25 we show the necessary power from both reflections so that the total power is as required. The reflector 150 is depicted in FIG. 26. The reflector 150 is designed starting from cusp 154 in the symmetry axes. Note that each reflection irradiates mostly the opposite side, but is visible from the same side too. Some angles have been particularly designated by the letters A through and E in FIG. 25. The corresponding edge rays are indicated also in FIG. 27.

Between −A and A angles the reflections are immediately adjacent to the source 152. The cusp 154 in the center is not visible. Between A and B angles the reflection from the same side as the observer slowly disappears at the cusp 154, while the other increases in size for compensation. Starting with C the source 152 is gradually eclipsed by the end of the reflector 150. The largest angle for which a constant irradiance can be achieved is labeled D. The source 152 is not visible. The power is produced exclusively by the opposite side reflection. The reflector 150 is truncated so that between D and E the reflection gradually disappears at the end of the reflector 150.

The inner part of the reflector 150 which irradiates the same side, is somewhat arbitrary. In the example shown, we have designed it as an involute because this avoids trapped radiation and at the same time yields the most compact design. At the center the power from each reflection is very nearly equal to that of the source 152 itself. Once the power radiated to the same side is determined, the reflector 150 is designed so that the sum of the contributions of the two reflections and the source 152 matches the desired distribution. Proceeding outward, the eclipsing of the source 152 by the reflector 150 is not known at first, because it depends on the end point. This problem is solved by iterating the whole design procedure several times.

The point of truncation is determined by the criterium that the reflector 150 intersects the edge rays marked B from the cusp 154. This is because the preferred design is based on a maximum of one reflection. This criterium is also the reason for designing the inner part as an involute.

Figure 27:
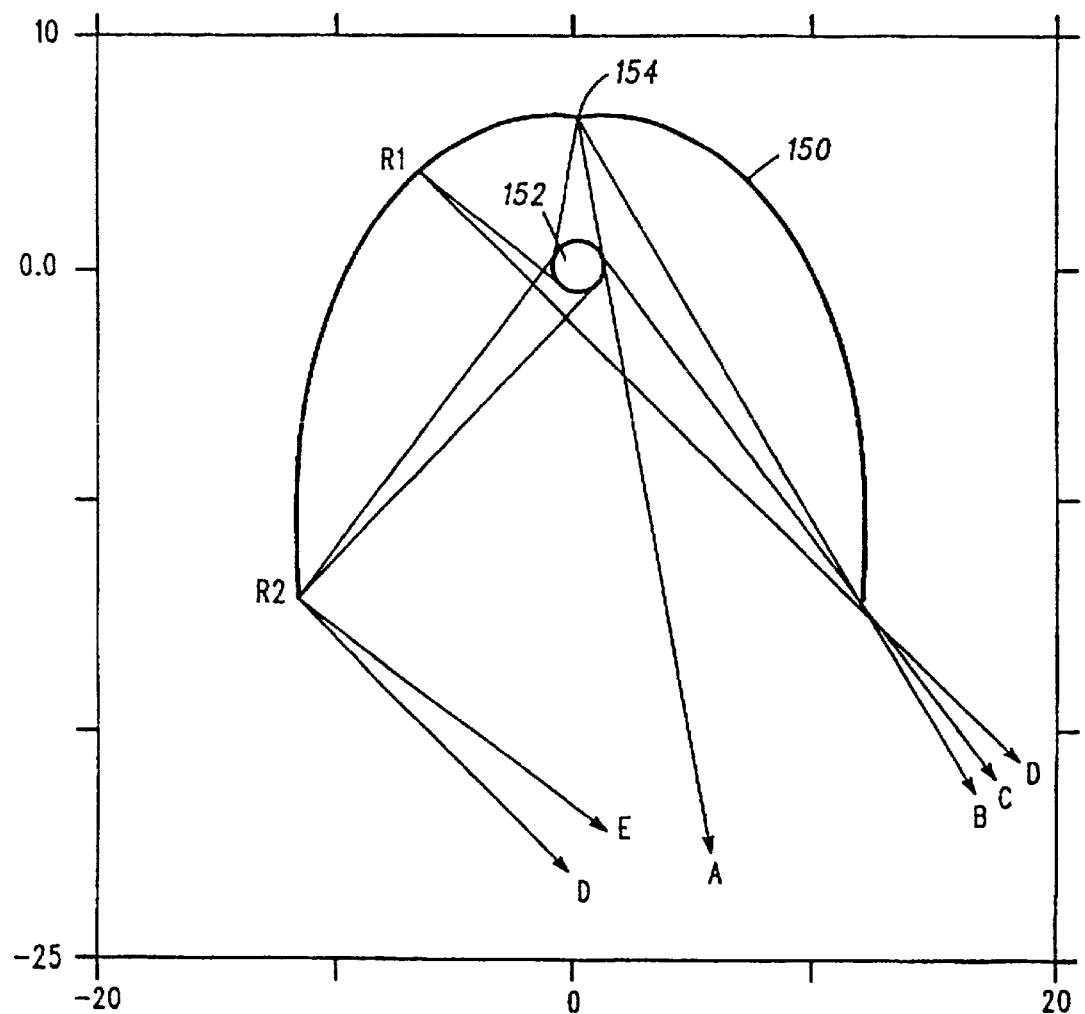
FIG. 27 shows some edge rays corresponding to the angles designated in FIG. 25.

The angular decay range D to E in FIGS. 25 and 27 depends only on the distance of the end point to the source 152. Depending on the starting distance from the cusp 154 to the source 152, the device can be designed either more compact, but with a broader decay zone, or larger, and with a more narrow decay zone. The reflector 150 shown has a cusp distance of 2.85 source diameters. The end point is at a distance of 8.5 source diameters. This ensures that a constant irradiance is produced between −43 and 43 degrees. The decay zone is only 7 degrees. This design was chosen in order that the source 152 is eclipsed just before the angle of truncation.

The reflector 150 cannot be made much more compact as long as one designs for a minimum of one reflection. At the angle D the opening is nearly totally filled with radiation as seen in FIG. 27. The distance the reflector 150 extends downward from the source 152 is also determined by the maximum power required to produce at angle D. The distance of the cusp 154 also cannot be diminished, otherwise the criterium for the end of the reflection 150 is reached sooner, the reflector 150 has to be truncated and the maximum power produced is also less.

The embodiments described hereinbefore involve at most one reflection. However, in other forms of the invention various systems based on multiple reflections can be designed using the teachings provided herein. As more reflections contribute, the freedom of the designer increases. This freedom can be used to adapt the reflector to other criteria, such as a need for compactness. In any case, independent of the number of reflections, once the general architecture has been determined, tailoring the reflector to one set of edge rays determines its shape without the need for approximations or a need to undergo optimizations.

We claim:

1. A method of manufacturing a collector of light of irradiance I from a radiant source, comprising the steps of:
   providing a transducer device for collecting the light; and
   providing a light reflecting surface by constructing a reflector contour with a family of edge rays defined along a reference line defined by $\overline{k}(t)$ and forming a shape for said reflector contour relative to said reference line by tracing a vector $\overline{R}(t)$ to form said shape where t is a scalar parameter position and wherein:

$$\overline{R}(t)=\overline{k}(t)+D\overline{u}(t)$$

where k(t)=a parameterization of said reference line;
D=a distance from a point on said reference line to said reflecting surface along a desired edge ray through the point;
n=unit vector along a desired direction of said desired edge ray;
with said reflector contour reflecting said desired edge ray into actual edge ray a(R(t)), where a is a multidimensional unit vector pointing towards an edge of said radiant light, and said D being the solutions of:

$$dD/dt=((dk(t)/dt)\cdot(a-u)+D(du/dt)\cdot a)/1-a\cdot u$$

2. The method as defined in claim 1 further including the step of providing light refractive medium means characteristic of a dielectric for generating the family of edge rays.

3. The method as defined in claim 1 futher including the step of defining an edge ray having undergone multiple reflections.

4. The method as defined in claim 1 further including light refracting medium means and including the additional step of tailoring the desired edge ray into the actual edge ray.

5. The method as defined in claim 1 wherein said reflector contour is comprised of at least two reflector contours.

6. The method as defined in claim 5 wherein said two reflector contours comprise include a cusp positioned therebetween.

7. The method as defined in claim 6 wherein said two reflector contours comprise a mirror image surface disposed about said cusp.

8. The method as defined in claim 1 wherein said reflector contour is comprised of a compound concentrator reflector.

9. The method as defined in claim 8 wherein said compound concentrator reflector is selected from the group consisting of CHC, CEC and CPC.

10. The method as defined in claim 1 further including the step of defining said reflector contour by generating tangent lines to a surface of the contour, said tangent lines generating a trailing edge ray which is used in conjunction with a function describing the irradiance, I, to calculate a leading edge ray.

11. The method as defined in claim 1 wherein the expression dD/dt is used in conjunction with calculating the leading edge ray to determine a new portion of the reflector contour.

12. A method of collecting light of irradiance I from a radiant source over an angular range, comprising the steps of:

collecting light from the source using a transducer means; and defining light means for manipulating light received from the source using at least one of the steps (a) using light refracting medium means and (b) using a light reflector contour having a reflective surface established by the step of defining a family of edge rays relative to a reference line expressed as k(t) and a point located on said reference line and further defined by a desired edge ray passing through the point and extending to said reflector contour, wherein t is a scalar parameter position and defining said reflector contour by applying an expression R(t):

$$R(t) = k(t) + Du(t)$$

where k(t)=a parameterization of said reference line;

D=a distance from the point on said reference line to at least one of said refracting medium means and said reflecting surface along said desired edge ray through the point;

u=a unit vector along a desired direction of said desired edge ray;

and said reflector contour and said light refracting medium means reflecting and refracting, respectively, said desired edge ray into an actual edge ray a R(t)), where a is a multidimensional unit vector pointing towards an edge of said transducer means and wherein the desired edge ray is tailored into the actual edge ray by at least one of said reflector contour and said retracting medium means.

13. The method as defined in claim 12 further including the step of defining an edge ray having undergone multiple reflections.

14. The method as defined in claim 12 further including light refracting medium means and including the additional step of tailoring the desired edge ray into the actual edge ray.

15. The method as defined in claim 12 wherein said reflector contour comprises at least two reflector contours.

16. The method as defined in claim 15 wherein said two reflector contours include a cusp positioned therebetween.

17. The method as defined in claim 16 wherein said two reflector contours comprise a mirror image surface disposed about said cusp.

18. The method as defined in claim 12 wherein said reflector contour comprises a compound concentrator reflector.

19. The method as defined in claim 18 wherein said compound concentrator reflector is selected from the group consisting of CHC. CEC and CPC.

20. The method as defined in claim 12 further including the step of defining said reflector contour by generating tangent lines to a surface of the reflector contour, said tangent lines generating a trailing edge ray which is used in conjunction with a function describing the irradiance, I, to calculate a leading edge ray.

21. The method as defined claim 20 wherein the expression dD/dt is used in conjunction with calculating the leading edge ray to determine a new portion of the reflector contour.

* * * * *

UNITED STATES PATENT AND TRADEMARK OFFICE
CERTIFICATE OF CORRECTION

PATENT NO. : 6,019,485
DATED : February 1, 2000
INVENTOR(S) : Winston et al.

It is certified that error appears in the above-identified patent and that said Letters Patent is hereby corrected as shown below:

Column 1,
Line 54, change "fight" to -- light --.
Line 64, change "taioring" to --tailoring --.

Column 2,
Line 57, change "lambertian" to -- Lambertian --.

Column 3,
Line 41, change "illuniination", to -- illumination --.
Line 51, change "desizn" to -- design --.
Line 59, change "Wnston" to -- Winston --.
Line 60, change "Nonimazing" to -- Nonimaging --.

Column 4,
Line 26, change "fine" to -- line --.
Line 49, change "sold" to -- solid --.

Column 5,
Line 33, change "Wmston" to --Winston --.

Column 6,
Line 2, delete "[%]".
Line 3, delete "[%]".
Line 4, delete "[%]".

Column 7,
Line 34, change "enissiviry" to -- emissivity --.

Column 8,
Line 53, change "$=\Phi^{min}$", to -- $=-\Phi^{min}$ --.
Line 60, change "syntnetrical" to -- symmetrical --.

Column 9,
Line 2, change "larnbertain" to -- Lambertian --.

Column 11,
Line 60, change "illurninance" to -- illuminance --.

UNITED STATES PATENT AND TRADEMARK OFFICE
CERTIFICATE OF CORRECTION

PATENT NO. : 6,019,485
DATED : February 1, 2000
INVENTOR(S) : Winston et al.

It is certified that error appears in the above-identified patent and that said Letters Patent is hereby corrected as shown below:

Column 13,
Table III, change "95.1407" to -- 98.1407 --.
Table III, change "95.4422" to -- 98.4422 --.
Table III, change "95.7437" to -- 98.7437 --.
Table III, change "10.7353" to -- 10.7383 --.

Column 19,
Line 29, change "150" to -- 152 --.
Line 31, change "150" to -- 152 --.

Column 20,
Line 34, change "n=unit" to -- u=nit --.
Line 39, change "light" to -- source --.
Line 55, delete "comprise".

Column 22,
Line 31, change "20" to -- 12 --.

Signed and Sealed this

Fourth Day of September, 2001

Attest:

NICHOLAS P. GODICI
Attesting Officer
Acting Director of the United States Patent and Trademark Office